United States Patent
Govindassamy

(10) Patent No.: US 10,334,525 B1
(45) Date of Patent: *Jun. 25, 2019

(54) METHOD AND APPARATUS FOR COLLABORATIVE PAGING INFORMATION TRANSMISSION

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/370,056

(22) Filed: Dec. 6, 2016

(51) Int. Cl.
*H04W 52/02* (2009.01)
*H04W 48/10* (2009.01)
*H04W 4/80* (2018.01)
*H04W 88/02* (2009.01)
*H04W 84/04* (2009.01)

(52) U.S. Cl.
CPC ......... *H04W 52/0219* (2013.01); *H04W 4/80* (2018.02); *H04W 48/10* (2013.01); *H04W 84/042* (2013.01); *H04W 88/02* (2013.01)

(58) Field of Classification Search
CPC ....... H04W 4/008; H04W 4/80; H04W 8/005; H04W 52/0251; H04W 76/02; H04W 76/10; H04W 84/18; H04W 88/16; H04W 48/10; H04W 48/16; H04W 48/17; H04W 52/0219; H04W 76/15; H04W 84/042; H04W 88/02; H04N 21/258; H04N 21/25816
See application file for complete search history.

(56) References Cited

U.S. PATENT DOCUMENTS

| 7,020,438 | B2 | 3/2006 | Sinivaara et al. |
| 7,020,439 | B2 | 3/2006 | Sinivaara et al. |
| 7,444,150 | B2 | 10/2008 | Rick et al. |
| 8,219,118 | B2 | 7/2012 | Kim et al. |
| 8,521,194 | B2 | 8/2013 | Laroia et al. |

(Continued)

OTHER PUBLICATIONS

U.S. Appl. No. 15/296,571, filed Oct. 18, 2016. Title: Method and Apparatus for Paging Information Transmission.

(Continued)

*Primary Examiner* — Khoa Huynh
(74) *Attorney, Agent, or Firm* — Lerner, David, Littenberg, Krumholz & Mentlik, LLP

(57) ABSTRACT

As the variety and number of wireless client devices have increased, often there may be multiple client devices in close proximity of each other. In addition to the connectivity to the wireless wide area network (WWAN), the client devices may have short range link to directly connect with each other. Two or more client devices in a given area may be camped on the same cell of the same WWAN, and the client devices may be decoding the paging information from the same cell. A method and apparatus are disclosed such that a client device may decode the paging information from the WWAN and relay the WWAN paging information to other client devices over the short range link. This may enable other client devices to avoid having to decode the paging information directly from the WWAN which may reduce their power consumption.

43 Claims, 15 Drawing Sheets

(56) References Cited

U.S. PATENT DOCUMENTS

| | | |
|---|---|---|
| 8,804,655 B2 | 8/2014 | Rue |
| 8,806,530 B1 * | 8/2014 | Izdepski ............... H04N 21/258 |
| | | 725/141 |
| 8,923,244 B2 | 12/2014 | Tinnakornsrisuphap et al. |
| 9,119,153 B2 | 8/2015 | Deivasigamani et al. |
| 9,491,678 B2 | 11/2016 | Cui et al. |
| 9,516,564 B2 | 12/2016 | Cui et al. |
| 9,549,343 B2 | 1/2017 | Cui et al. |
| 9,723,536 B2 | 8/2017 | Wang et al. |
| 9,730,157 B2 | 8/2017 | Puranik et al. |
| 9,998,898 B1 | 6/2018 | Govindassamy |
| 2004/0137908 A1 | 7/2004 | Sinivaara et al. |
| 2004/0202141 A1 | 10/2004 | Sinivaara et al. |
| 2008/0080407 A1 | 4/2008 | Abbate et al. |
| 2009/0059795 A1 | 3/2009 | Fonseca, Jr. et al. |
| 2009/0157799 A1 * | 6/2009 | Sukumaran ............ G06Q 10/10 |
| | | 709/203 |
| 2011/0194530 A1 | 8/2011 | Tinnakornsrisuphap et al. |
| 2012/0142328 A1 | 6/2012 | Awoniyi et al. |
| 2013/0137423 A1 | 5/2013 | Das et al. |
| 2013/0301451 A1 | 11/2013 | Siomina et al. |
| 2014/0050086 A1 | 2/2014 | Himayat et al. |
| 2014/0066132 A1 | 3/2014 | Burke et al. |
| 2015/0018010 A1 | 1/2015 | Fischer |
| 2015/0163041 A1 | 6/2015 | Kodali et al. |
| 2015/0208457 A1 * | 7/2015 | Thanayankizil ...... H04W 76/15 |
| | | 370/329 |
| 2016/0227351 A1 | 8/2016 | Gu et al. |

OTHER PUBLICATIONS

U.S. Appl. No. 15/351,999, filed Nov. 15, 2016. Title: Method and Apparatus for Collaborative Broadcast Information Tranmission.
U.S. Appl. No. 15/352,097, filed Nov. 15, 2016. Title: Method and Apparatus for Collaborative Broadcast Information Reception.

* cited by examiner

METHOD AND APPARATUS FOR COLLABORATIVE PAGING INFORMATION TRANSMISSION

CROSS REFERENCE TO RELATED APPLICATIONS

This application is related to U.S. application Ser. No. 15/296,571 filed Oct. 18, 2016, which is related to U.S. application Ser. No. 15/351,999, filed Nov. 15, 2016, which is related to U.S. application Ser. No. 15/352,097, filed Nov. 15, 2016, and U.S. application Ser. No. 15/383,450 filed Dec. 19, 2016, the disclosures of which are hereby incorporated herein by reference.

BACKGROUND

A client device as defined in the present disclosure is a device that may access voice, video, text, instant messaging, internet and other services from a wireless communication network. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, an industrial equipment, etc.

The wireless communication networks are often referred to as Wireless Wide Area Network (WWAN). The internet service offered by such networks is often referred to as mobile broadband internet or Mobile Broadband (MB) and the WWANs are often referred to as mobile broadband networks. The terms WWAN and MB are used interchangeably herein. An example of a mobile broadband network is the Long Term Evolution (LTE) from the 3rd Generation Partnership Project (3GPP). The LTE technology and its evolution are often referred to as fourth generation (4G) technologies. A client device may also use any of the previous generation technologies such as "2G", "3G" from 3GPP and other standardization bodies. A client device may also use future generation technologies for mobile networks. Typically, as shown in FIG. 1, a WWAN comprises elements such as client devices or mobile stations and one or more base stations. Other network devices may also be employed, such as a mobile switching center (not shown). As illustrated in FIG. 1, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the MS communicates with the BS in both the DL and UL directions. For instance, such communication is carried out in cellular communication systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred to herein as a "message."

A base station to which a client device may be downlink synchronized and/or communicating with at any given time is referred to herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called as an intra-cell handover. The purpose of intra-cell handover may be that the new channel is better suited for communication than the previous channel within the same cell. Cell reselections or handovers amongst cells that use the same frequency are referred to herein as intra-frequency cell reselection or handover. Cell reselections or handovers amongst cells that use different frequencies are referred to herein as intra-frequency cell reselection or handover. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure depends generally on whether a client device is engaged in an active communication with the wireless communication network.

Normally, certain types of system information may be required by all client devices so that they may communicate with the wireless communication network. The system information typically includes system synchronization information, system parameters, resource allocation information, paging information, etc. The wireless communication network may transmit such system information as broadcast data so that all client devices within its coverage area may be able to receive that information. Such information is herein referred to as "broadcast messages."

Typically in a wireless communication system a base station may group the system information and each group of system information may be transmitted as multiple broadcast messages and such broadcast messages are herein referred to as system parameter messages. The system parameter messages may carry important system information without which the client device may not be able to communicate with the wireless communication network. The wireless communication network may transmit these system parameter messages at regular intervals in such a way that any client device that enters its coverage area may receive these system parameter messages and may be able to communicate with the wireless communication network at the earliest possible time. Client devices that are already in the base station's coverage area may also periodically receive these system parameter messages for possible updates. Normally a client device may store the system parameter messages in its memory for the current SBS.

Typically, in wireless communication systems, most of the system parameter messages may not change frequently. For example, some system parameter messages may change once or twice a day and some system parameter messages may not change for many days.

In some wireless communication systems, when a client device switches to a new base station due to cell reselection or handover, it may be required to receive the system parameter messages for the new SBS and certain system parameter messages for the selective list of NBSs corresponding to the new SBS.

The set of all system parameter messages broadcast by a base station is herein referred to as "base station broadcast system information." The individual block of system information message may be referred to as System Information Block (SIB). Two or more SIBs may be grouped and sent as a single System Information (SI) message. There may be different SIBs describing different groups of system parameters such as SIB Type1 (SIB1), SIB Type2 (SIB2), etc. The SI for one or more cells may be periodically updated by the network. To ensure that the client devices are using the correct version of the SI, a field referred to herein as "change-mark" is generally included in the SI messages. A client device may store the change-mark of the SIs it has decoded. If the new SI is transmitted by a cell, it may increment the change-mark to enable the client terminal to detect that it needs to acquire the newly updated SI. The change-mark of the newly acquired SI is then used as latest version for detecting any future changes in the SI. The change-mark field may be incremented in modulo arithmetic to keep the field bit-width to a minimum. For example, the change-mark may be incremented modulo-8 and the value may be represented by a 3-bit wide field.

In idle mode, a client device for the most part may turn off a majority of its circuitry to reduce power consumption. This is often referred to as "sleep" state, a sub-state within the idle mode. A client device may remain in a sleep state for a long duration and may wake up at the desired time window where it expects to receive the paging messages and certain SIB s. This alternating sequence of sleep and wake-up in idle mode is referred to herein as Discontinuous Reception (DRX). The sleep and wake-up sequence may follow regular pattern and its period is often referred to as DRX cycle. The success rate for the incoming calls (e.g., mobile terminated voice calls and/or data calls) in a client device is directly related to the successful reception of paging messages. Normally, in idle mode, in addition to the reception of paging messages and SIB messages, a client device may continue to search and monitor neighbor cells.

When a client device performs a network registration procedure to get service from a cell, it decodes the system information broadcast in the cell. The client device may store such system information. The system information carries important information regarding the cell reselection criteria. Such information includes but not limited to the tracking area identity (TAI), Public Land Mobile Network Identity (PLMN ID) which uniquely identifies a particular network operator, Closed Subscriber Group Identity (CSG ID), RAT type, neighbor cell frequencies, etc. This information may help to decide whether a cell is a "suitable cell" for the client device to avail all the services offered by it, or the cell is an "acceptable cell" where the client device may avail only limited services such as emergency calls. The client device may have to perform the network registration procedure to get service from the network and for the network to be able to page the client device for mobile terminated (incoming) calls. The network registration procedure may be typically performed by a client device with a particular cell. A group of cells in the geographic vicinity of each other may form a registration area. A registration area may be identified based on the system information of a cell. For example, the TACs of a group of cells in a registration area may be the same.

Each base station in a wireless communication network may be identified by a unique identifier referred to herein as Cell Identity (CID). The CID of a base station may become known to a client device when it decodes SI from the base station. To avoid unnecessary updates from a client device and yet ensure the ability to reach a client device at any given time, the network may organize a group of cells into a "tracking area" and use a Tracking Area Identity (TAI) to identify the various groups of cells. This is shown in FIG. 2 where four different tracking areas are illustrated. A cell may broadcast information about the tracking area it belongs to by including the TAI information in the system information. A client device may be required to inform the network when it begins to receive service from a cell that belongs to a tracking area that is different from the tracking area of the cells from which it was previously receiving service. The process of informing the network that the client device has begun receiving service from a cell that belongs to a new tracking area is referred to herein as Tracking Area Update (TAU) procedure. With this method, a client device performs TAU only when there is a change in TAI of the cell from which it is getting service. For example, in FIG. 2, when a client device reselects from the cell with CID=1003 to the cell with CID=1007 which has the same TAI, it may not perform TAU procedure. However, when the client device reselects from the cell with CID=1007 and TAI=200 to the cell with CID=1012 and TAI=201, it may perform TAU procedure.

Different client devices may be identified using their respective unique identities. For example, International Mobile Subscriber Identity (IMSI), Temporary Mobile Subscriber Identity (TMSI), the Media Access Control (MAC) address, the Internet Protocol (IP) address may be used for the identity. Regardless of any particular identity used, it is generically referred to herein as Client Device Identity (CDI).

As long as a client device is in the same registration area, the client device may not perform network registration procedure again except that a periodic network registration update procedure may need to be performed even if the client device continues to move within the same registration area. If the client device moves to a cell which does not belong to the registration area in which the client device is registered, then the client device may perform network registration procedure to get access to and service from the network.

When a client device is in idle mode, the network may only be aware of the location of the client device at the registration area level. In order for a network to page a client device, it may need to send the paging message in all cells belonging to the same registration area. The instances for paging message transmission, known as paging occasions (POs), are usually derived based on a client device's unique identity and the paging cycle. The network may transmit a paging message addressed to a specific client device in its specific PO. When a client device performs cell reselection, the exact instances of paging occasions may be different in the new serving cell. Depending on the exact timing of the cell reselection and the timing of the POs in the old serving cell and the new serving cell, the client device may potentially miss a paging message or may receive it with delay. A single paging message received in a single PO may include multiple paging records to page multiple client devices. Different client devices may be identified within a paging message by using their respective unique identities in the paging records. For example, International Mobile Subscriber Identity (IMSI) may be used for the identity, or in case of 3GPP LTE wireless communication system, System Architecture Evolution (SAE)-Temporary Mobile Subscriber Identity (S-TMSI) may be used.

As the variety and number of client devices have increased, often there may be multiple client devices in close proximity of each other. For example, a number of smartphones, tablets, entertainment systems, gaming consoles, navigation systems, etc. with connectivity to the wireless communication network may be present in a home, an office, a car, etc. There may be a need for the client devices to communicate with other client devices that may be in their close proximity. Therefore, in addition to the connectivity to the wireless communication network, the client devices may have other short range wireless connectivity interfaces to directly connect with each other without relying on a WWAN. Examples of such Short Range Wireless Links (SRWL) may include Wireless Local Area Network (WLAN) commonly known as Wi-Fi, Bluetooth™, or some other local area wireless networking schemes. The SRWLs may operate in a one-to-one or one-to-many mode of communication. For example, the WLAN may operate in an infrastructure mode in which the client devices communicate through an Access Point (AP) that may serve as a bridge to other client devices and other network elements such as internet. The WLAN may also operate in an ad hoc mode in which the two client devices may communicate directly with each other in a peer-to-peer manner. In general the SRWL may use any one of the well known networking topologies such as point-to-point, bus, star, ring or circular, mesh, tree, hybrid, or daisy chain. An example of this scenario is illustrated in FIG. 3 which includes the WWAN 302 and the SRWL 304 between the client devices Smartphone 308 and Smartphone 310. The SRWL 304 has the coverage area 306. The two client devices Smartphone 308 and Smartphone 310 are connected to the WWAN and directly with each other over the SRWL. The client device Smartphone 312 is connected to the WWAN but it is outside the coverage area of the SRWL.

Two or more client devices in a given area may be camped on the same cell of the same WWAN, and the client devices may be decoding the paging information from the same cell. This may be a redundant reception since the client devices may be camped on the same cell of the same WWAN.

SUMMARY

A method and apparatus are disclosed such that a single client device may decode the paging information from the WWAN and relay the WWAN paging information to the other client devices over the SRWL. This may enable other client devices to avoid having to decode the paging information directly from the WWAN. As power consumption of client devices may be critical, the relaying of the paging information over SRWL from one client device to other client devices may be a more power efficient method for other client devices.

In accordance with an aspect of the present disclosure, a method of collaborative communication of paging information in a communication network, in which a Short Range Wireless Links (SRWL) is established between a first client device and at least one second client device, may include controlling, by a processing device, at the first client device, transmitting a broadcast Primary Client Device (PCD) Request message over the SRWL; receiving a PCD Accept message over the SRWL from at least one third client device of the at least one second client device, in which the PCD Accept message is transmitted from the at least one third client device based on a determination at the least one third client device to receive paging information of a Wireless Wide Area Network (WWAN) through the first client device; and transmitting over the SRWL a PCD Confirm message indicating designation of the first client device as a PCD for the at least one third client device, in which the at least one third client device is a Secondary Client Device (SCD) of the first client device.

In one alternative, the at least one second client device may include a plurality of second client devices, and the method may further include when (i) at least one fourth client device of the plurality of second client devices transmits over the SRWL a second PCD Request when the PCD Request is transmitted from the first client device and (ii) the first client device is the PCD for the least one third client device, controlling, by the processing device, at the first client device, receiving, from the at least one fourth client device over the SRWL, a PCD Revoke message, in which the at least one fourth client device, by sending the PCD Revoke message, accepts the first client device as the PCD for the at least one fourth client device.

In one alternative, the method may include controlling, by the processing device, at the first client device, communication and exchanging over the SRWL of WWAN capabilities with the SCD including at least one Radio Access Technology (RAT) type supported.

In one alternative, the at least one RAT type may include at least one of one Code Division Multiple Access (CDMA), Global System for Mobile communication (GSM), Long Term Evolution (LTE) or General Packet Radio Service (GPRS).

In one alternative, the exchanging of WWAN capabilities may include, for a given cell on which each of the first client device and the least one third client device is camped, at least one of a current WWAN identity, a given RAT type, a cell identification (CID), target area information (TAI), frequency of channel, or default Discontinuous Reception (DRX) cycle or paging cycle.

In one alternative, the method may further include controlling, by the processing device, at the first client device, when the first client device and the at least one third client device are currently camped on to a same serving cell of a same Radio Access Technology (RAT) type and a same frequency, monitoring over the SRWL and decoding a paging message of the WWAN addressed to the SCD; and requesting over the SRWL to the SCD decoding information required for decoding the paging message and receiving the decoding information from the SCD.

In one alternative, the decoding information may indicate at least one of SCD identity, a Discontinuous Reception (DRX) cycle, or other information necessary for deriving a Paging Occasion (PO) at the PCD and successfully decoding a paging record in the paging message.

In one alternative, the SCD identity may be International Mobile Subscriber Identity (IMSI) or Temporary Mobile Subscriber Identity (TMSI).

In one alternative, the method may further include controlling, by the processing device, at the first client device, when the decoding information is received, entering into a Cellular Paging Decoded and Transmitted over SRWL (CPDTOS) mode with the SCD, in which the SCD disables paging message decode related processing as long as the SCD is connected to the PCD and is in the CPDTOS mode.

In one alternative, the method may further include controlling, by the processing device, at the first client device, when a change in a camped on cell is determined for the PCD or the SCD, communication with the SCD over the SRWL to determine whether to continue in or exit the CPDTOS mode.

In one alternative, the method may further include controlling, by the processing device, at the first client device, when the first client device as the PCD of the at least one third client device and at the least one third client device are currently camped on to cells $C_{f1}$ and $C_{f2}$ respectively of different frequencies having a same Radio Access Technology (RAT) type, determining whether paging messages from the cell $C_{f2}$ are decodable, wherein to decode the paging messages the PCD is required to tune to frequency f2 of the cell $C_{f2}$ while monitoring a frequency f1 of the cell $C_{f1}$; when a determination is the paging messages from the cell $C_{f2}$ are not decodable, not initiating entry into a Cellular Paging Decoded and Transmitted over SRWL (CPDTOS) mode for the SCD; and when a determination is the paging messages from the cell $C_{f2}$ are decodable, entering the CPDTOS mode for the SCD, monitoring Paging Occasions (POs) and decoding the paging messages.

In one alternative, the method may further include controlling, by the processing device, at the first client device, when a cell reselection is determined in the PCD or the SCD, communication with the SCD over the SRWL whether to continue in or exit the CPDTOS mode.

In one alternative, the method may further include controlling, by the processing device, at the first client device, when the PCD and the SCD are currently camped on cells $C_{RAT1}$ and $C_{RAT2}$ of different first and second Radio Access Technology (RAT) types RAT1 and RAT2, respectively, determining whether (i) the RAT2 and frequencies used by the RAT2 are supported by the PCD, and (ii) a paging message from the cell $C_{RAT2}$ is decodable where decoding of the paging message requires the PCD to tune a frequency of the cell $C_{RAT2}$ while the PCD is monitoring the cell $C_{RAT1}$; when the paging message from the cell $C_{RAT2}$ is determined to be not decodable, not initiating entry into a Cellular Paging Decoded and Transmitted over SRWL mode (CPDTOS) with the SCD; and when the paging message from the cell $C_{RAT2}$ is determined to be decodable, entering into the CPDTOS mode with the SCD, decoding given paging messages in respective Paging Occasions (POs) time instances, and determining whether a paging record of the decoded given paging messages matches an identity of the SCD.

In one alternative, the method may further include, when a cell reselection is determined at the PCD or the SCD, controlling, by the processing device, at the first client device, communication over the SRWL with the SCD to determine whether to continue in or exit the CPDTOS mode with the SCD.

In one alternative, the method may further include controlling, by the processing device, at the first client device, when the PCD agrees with the SCD on monitoring and decoding paging messages for the SCD which is camped on to a same or different cell as a serving cell of the PCD and having a same or different frequency or Radio Access Technology (RAT) type from the serving cell, monitoring Paging Occasion (POs) in downlink for all agreed upon cells of different frequencies and RAT types.

In one alternative, the method may further include controlling, by the processing device, at the first client device, managing a downlink monitoring schedule for each of the agreed upon cells.

In one alternative, the method may further include controlling, by the processing device, at the first client device, when an overlap in Paging Occasions (POs) of a serving cell of the SCD which is different than a serving cell of the PCD, in which the SCD serving cell has a same or different frequency and Radio Access Technology (RAT) type as the PCD serving cell, is determined, transmitting over the SRWL a Paging Details Information Request message to the SCD to change a Discontinuous Reception (DRX) cycle to determine whether the change in the DRX avoids PO overlap; and receiving over the SRWL from the SCD a Paging Details Information Response message indicating the change in the DRX cycle at the SCD; and when any non-overlapping POs for the SCD is not determined, communicating over the SRWL an indication that any non-overlapping POs for the SCD is not determined and not entering or exiting a Cellular Paging Decoded and Transmitted over SRWL mode (CPDTOS) for the SCD.

In one alternative, the method may further include controlling, by the processing device, at the first client device, when, based on an attempt to decode a paging message for the SCD, in which the SCD is camped on at least one cell having a same or different frequency and (Radio Access Technology) RAT type as a serving cell of the PCD, an overlap with a Paging Occasion (PO) of the at least one first cell is determined, in which the PCD is entered into a Cellular Paging Decoded and Transmitted over SRWL mode (CPDTOS) with SCD, a process 1) of prioritizing a second cell having the same frequency and RAT type as the PCD serving cell, a process 2) of prioritizing PO decoding of a third cell having a frequency and RAT type other than the frequency and RAT type of the PCD serving cell, a process 3) of prioritizing PO monitoring based on a priority request from the SCD indicating a current state of battery level at the SCD, or a process 4) of, when the PO overlap is detected, deciding whether to monitor or cancel a given PO of a given SCD, according to priorities configured at the PCD for at least one of given SCDs, given RAT types or given frequencies for PO monitoring.

In one alternative, the process 1) may include, for a cell having a frequency and RAT type other than the frequency and RAT type of the PCD serving cell for which the overlap of the PO is determined, communicating over the SRWL to the SCD an indication that a next PO for the SCD may not be decodable, requesting the SCD to perform the PO decode by itself, and continuing the CPDTOS mode with the SCD, wherein, when a determination is a request from the PCD for decoding the PO and continuing the CPDTOS mode is denied by the SCD, exiting the CPDTOS mode with the SCD, and when an ongoing system information (SI) decode is completed and a non-overlapping PO for the SCD where the PCD previously exited the CPDTOS mode or could not enter the CPDTOS mode because of the overlap in the PO in the past due to the SI decode is determined, transmitting over the SRWL a WWAN Camped on Cell Information Request message or Enter CBIBOS mode request message to the SCD to request the SCD to enter the CPDTOS mode.

In one alternative, the process 2) may include determining to defer system information (SI) decoding for a given second cell having the same frequency and RAT as the PCD serving cell when delayed decoding of the SI is determined not to impact predetermined normal operation and performance of the PCD.

In one alternative, the process 3) may include determining, based on the priority request, a given SCD for monitoring of PO and another given SCD for canceling monitoring of PO.

In one alternative, the priority request may be communicated over the SRWL in a Paging Details Information Response message from the SCD.

In one alternative, the method may further include controlling, by the processing device, at the first client device, transmitting to the SCD, over the SRWL, a WWAN Camped-on Cell Information Request message indicating information of a cell $C_x$ on which the PCD is currently camped including at least one of Radio Access Technology (RAT) type, frequency or cell identity (CID); and when a WWAN Camped-on Cell Information Response message is received from the SCD over the SRWL indicating a relative time offset $RTO_{xy}$ of a cell $C_y$ on which the SCD is camped to the cell $C_x$ as estimated at the SCD, using the relative time offset $RTO_{xy}$ to synchronize timing with the cell $C_y$ and for decoding a paging message in the cell $C_y$.

In one alternative, the method may further include controlling, by the processing device, at the first client device, when the first client device includes M receiver/decoder circuits, decoding in parallel overlapping Paging Occasions (POs) from N cells of a same or different frequency and Radio Access Technology (RAT) type, in which M and N are the same or different.

In one alternative, the method may further include controlling, by the processing device, at the first client device, at any time communicating with the SCD over the SRWL and exiting Cellular Paging Decoded and Transmitted over SRWL mode (CPDTOS) with the SCD.

In one alternative, the method may further include controlling, by the processing device, at the first client device, when the PCD fails to decode a paging message in any PO for the SCD, notifying, over SRWL, the SCD of the failure to decode and exiting Cellular Paging Decoded and Transmitted over SRWL mode (CPDTOS) with the SCD.

In one alternative, the method may further include controlling, by the processing device, at the first client device, when the PCD decodes paging messages in respective time instances of Paging Occasions (PO) and a determination is no match of a paging record in the decoded paging messages with an identity of the SCD, transmitting, over the SRWL, a No Matching Paging Record Received Indication message to the SCD.

In one alternative, the method may further include controlling, by the processing device, at the first client device, when the paging record in the decoded paging messages is determined to match the identity of the SCD, transmitting over the SRWL a Matching Paging Record Received Indication message to the SCD.

In one alternative, the Matching Paging Record Received Indication message may be generated using respective applications executed in the PCD and the SCD and communicating through a peer to peer protocol on any logical channel of the SRWL.

In one alternative, each application may be independent of a given SRWL and achieved through a virtual communication port established in the PCD and the SCD, wherein a connection of the SRWL is mapped to the virtual communication port, and wherein the applications respectively of the PCD and SCD communicate using the virtual communication port.

In one alternative, the method may further include controlling, by the processing device, at the first client device, autonomously entering Cellular Paging Decoded and Transmitted over SRWL mode (CPDTOS) with a new SCD and starting broadcasting, over the SRWL, a Paging Details Information Request message.

In one alternative, the first client device may be configured to at least one of monitor or decode Paging Occasions (POs) of a set of cells having a same or different frequency and Radio Access Technology (RAT).

In one alternative, the method may further include controlling, by the processing device at the first client device, creating, with the SCD, a Cellular Paging Message Communication Channel (CPMCC) as a physical or logical channel which is pre-negotiated and dedicated for Cellular Paging Decoded and Transmitted over SRWL mode (CPDTOS) information exchange, in which the CPMCC has a periodicity and time slot for broadcast by the PCD of a Matching Paging Record Received Indication message, and a second periodicity and second time slot for monitoring by the SCD of receiving a paging record from the PCD, and in which cellular network information exchange other than the Matching Paging Record Received Indication is exchangeable between the SCD and the PCD over the CPMCC.

In one alternative, the first client device may use a cable modem thereof to provide Internet service while using a WWAN modem thereof only for monitoring and decoding of Paging Occasions (POs).

In one alternative, the method may further include controlling, by the processing device, at the first client device, when the PCD and the SCD are in Cellular Paging Decoded and Transmitted over Short Range Wireless Links (SRWL) mode (CPDTOS), a cell change occurs in the PCD or the SCD, and the PCD is not able to continue the CPDTOS mode with the SCD, transmitting, over the SRWL, an Exit CPDTOS mode Request message to and exiting the CPDTOS mode with the SCD.

In one alternative, the method may further include controlling, by the processing device, at the first client device, when the PCD and the SCD are in Cellular Paging Decoded and Transmitted over Short Range Wireless Links (SRWL) mode (CPDTOS), a Paging Occasion (PO) to be monitored for a serving cell of the PCD is changed, and the PCD is not able to continue the CPDTOS mode with the SCD, transmitting over the SRWL an Exit CPDTOS mode Request message to and exiting the CPDTOS mode with the SCD.

In one alternative, the method may further include controlling, by the processing device, at the first client device, when a first change in a default Discontinuous Reception (DRX) cycle or paging cycle is detected at the SCD and communicated to the PCD over the SRWL, in which the first change is based on detection of a change in a Paging Occasion (PO) of a serving cell of the SCD such that the PCD is not able to continue to monitor a new PO because of overlap in given PO, transmitting an Exit Cellular Paging Decoded and Transmitted over SRW) mode Request message to the SCD over the SRWL and exiting the CPDTOS mode with the SCD.

In one alternative, the method may further include controlling, by the processing device, at the first client device, performing Paging Occasion (PO) monitoring and decoding for detecting an update in system information (SI) of each monitored cell to avoid collision of paging decoding with the SI or any other decoding, without regard to an identify of a given SCD, in which the PO monitoring for detecting change in the SI by the PCD is combined with PO decoding for receiving paging messages for the given SCD.

In accordance with an aspect of the present disclosure, a method of collaborative communication of paging information in a communication network, in which a Short Range Wireless Links (SRWL) is established between a first client device and a plurality of second client devices, may include controlling, by a processing device, at the first client device, transmitting a broadcast Primary Client Device (PCD) Request message over the SRWL, wherein the PCD Request is transmitted from the first client device when a third client device of the second client devices transmits another broadcast PCD request over the SRWL; and when a PCD Accept message responsive to the another PCD request is transmitted from at least one fourth client device of the second client devices based on a determination at the least one fourth client device to receive paging information of a Wireless Wide Area Network (WWAN) through the third client device, (i) transmitting over the SRWL a PCD Revoke message and a PCD Confirm message accepting the third client device as the PCD for the at least fourth client device, or (ii) waiting for a predetermined time to receive over the SRWL another PCD Accept message from at least one fifth client device of the second client devices, such that the first client device is a PCD for the at least fifth client device.

In accordance with an aspect of the present disclosure, an apparatus may provide for collaborative communication of paging information in a communication network, in which a Short Range Wireless Links (SRWL) is established between a first client device and at least one second client device, where the apparatus includes: circuitry configured to control, by a processing device, at the first client device, transmitting a broadcast Primary Client Device (PCD) Request message over the SRWL; receiving a PCD Accept message over the SRWL from at least one third client device of the at least one second client device, in which the PCD Accept message is transmitted from the at least one third client device based on a determination at the least one third client device to receive paging information of a Wireless Wide Area Network (WWAN) through the first client device; and transmitting over the SRWL a PCD Confirm message indicating designation of the first client device as a PCD for the at least one third client device, in which the at least one third client device is a Secondary Client Device (SCD) of the first client device.

In accordance with an aspect of the present disclosure, a wireless communication device may include a receiver to receive a wireless communication; and a processing device configured for collaborative communication of paging information in a communication network, in which a Short Range Wireless Links (SRWL) is established between a first client device and at least one second client device, where the processing device is configured to control transmitting a broadcast Primary Client Device (PCD) Request message over the SRWL; receiving a PCD Accept message over the SRWL from at least one third client device of the at least one second client device, in which the PCD Accept message is transmitted from the at least one third client device based on a determination at the least one third client device to receive paging information of a Wireless Wide Area Network (WWAN) through the wireless communication device; and transmitting over the SRWL a PCD Confirm message indicating designation of the wireless communication device as a PCD for the at least one third client device, in which the at least one third client device is a Secondary Client Device (SCD) of the wireless communication device.

In accordance with an aspect of the present disclosure, an apparatus may provide for collaborative communication of paging information in a communication network in which a Short Range Wireless Links (SRWL) is established between a first client device and a plurality of second client devices, where the apparatus may include circuitry configured to control, at the first client device, transmitting a broadcast Primary Client Device (PCD) Request message over the SRWL, wherein the PCD Request is transmitted from the first client device when a third client device of the second client devices transmits another broadcast PCD request over the SRWL; and when a PCD Accept message responsive to the another PCD request is transmitted from at least one fourth client device of the second client devices based on a determination at the least one fourth client device to receive paging information of a Wireless Wide Area Network (WWAN) through the third client device, (i) transmitting over the SRWL a PCD Revoke message and a PCD Confirm message accepting the third client device as the PCD for the at least fourth client device, or (ii) waiting for a predetermined time to receive over the SRWL another PCD Accept message from at least one fifth client device of the second client devices, such that the first client device is a PCD for the at least fifth client device.

In accordance with an aspect of the present disclosure, a wireless communication device may include a receiver to receive a wireless communication; and a processing device configured for collaborative communication of paging information in a communication network, in which a Short Range Wireless Links (SRWL) is established between a first client device and a plurality of second client devices, wherein the processing device may be configured to control transmitting a broadcast Primary Client Device (PCD) Request message over the SRWL, wherein the PCD Request is transmitted from the wireless communication device when a third client device of the second client devices transmits another broadcast PCD request over the SRWL; and when a PCD Accept message responsive to the another PCD request is transmitted from at least one fourth client device of the second client devices based on a determination at the least one fourth client device to receive paging information of a Wireless Wide Area Network (WWAN) through the third client device, (i) transmitting over the SRWL a PCD Revoke message and a PCD Confirm message accepting the third client device as the PCD for the at least fourth client device, or (ii) waiting for a predetermined time to receive over the SRWL another PCD Accept message from at least one fifth client device of the second client devices, such that the wireless communication device is a PCD for the at least fifth client device.

DETAILED DESCRIPTION

Figure 1:
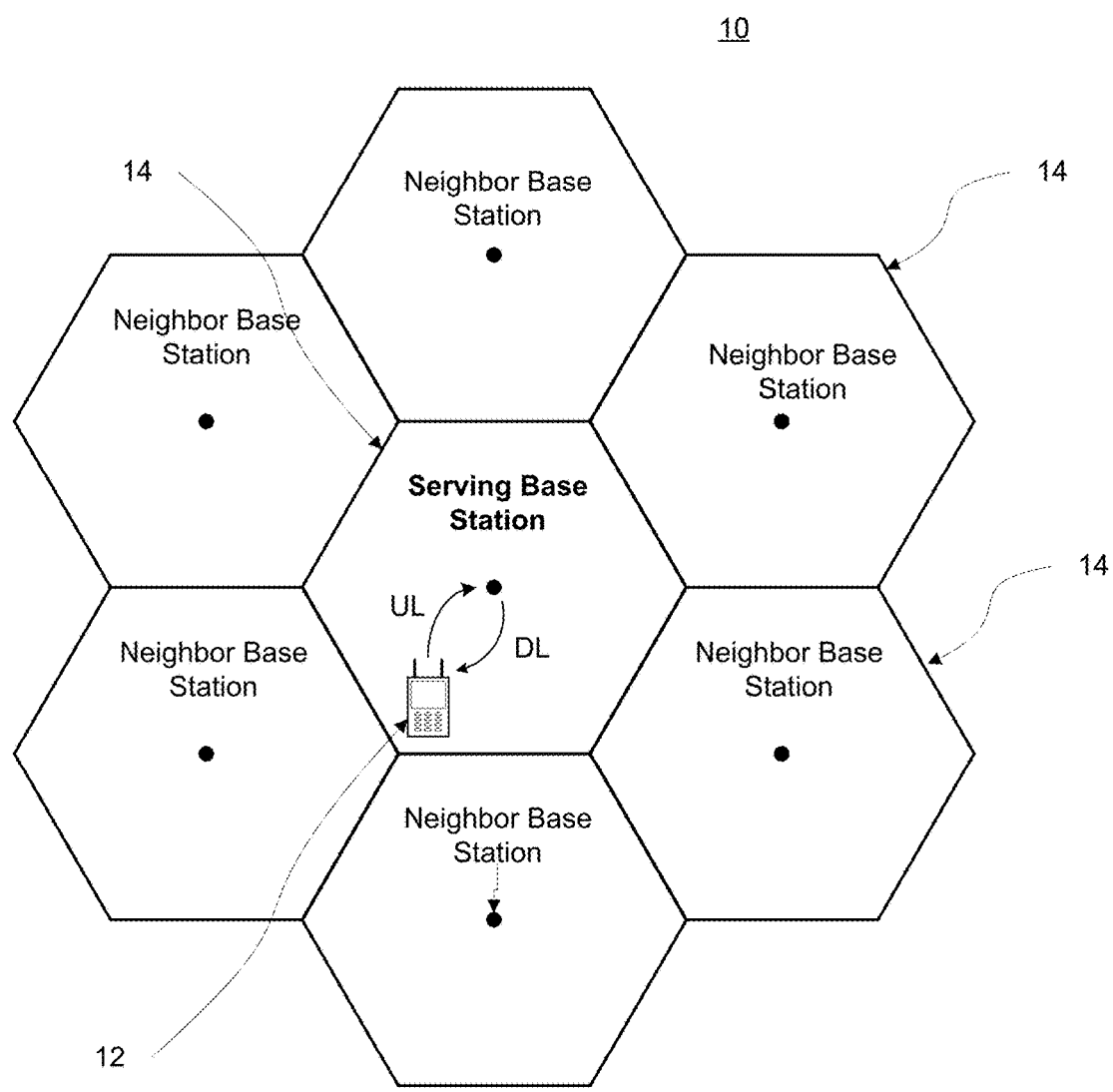
FIG. 1 illustrates a conventional mobile wireless communication system.
Figure 2:
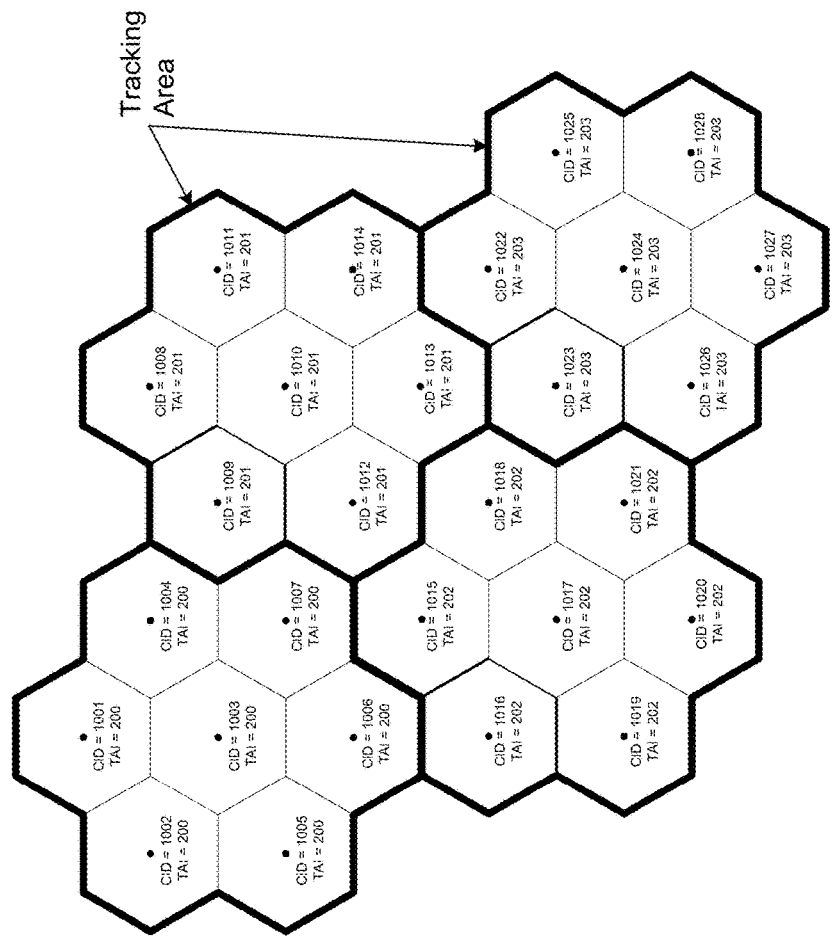
FIG. 2 illustrates the grouping of cells into tracking areas in a wireless communication system.
Figure 3:
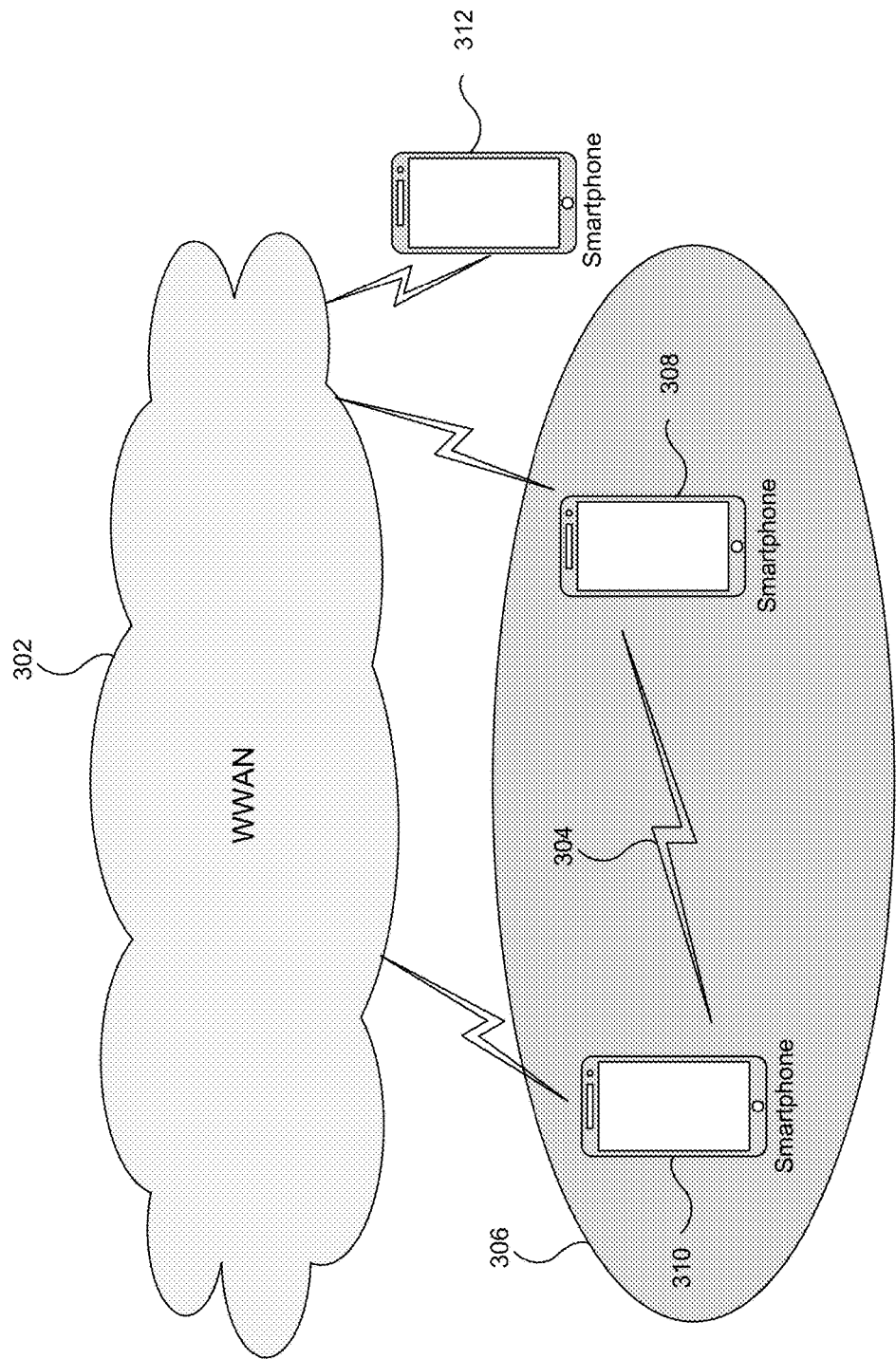
FIG. 3 illustrates a use case of two client devices in close proximity of each other using WWAN and SRWL.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although the aspects of the present disclosure may use the 3GPP LTE as an example for a WWAN used by client devices, the aspects described herein are applicable to other WWAN such as 3GPP Wideband Code Division Multiple Access (WCDMA), High Speed Packet Access (HSPA), Global System for Mobile communication (GSM), General Packet Radio Service (GPRS), Code Division Multiple Access (CDMA), etc. Similarly, although the WLAN may be used as an example SRWL for the client devices, other SRWL such as Bluetooth™ may be used.

The types of client devices connected to a WWAN may vary. For example, a standard laptop or a desktop Personal Computer (PC), a tablet, etc. may be connected for internet service. Another type device, referred to as machine type device, may be deeply embedded devices inside appliances such as a refrigerator, a washer, a dryer, etc. which may use internet service. This type of devices may have different service requirements such as they may be more delay tolerant than other types of client devices. Another type of device may be a smartphone which may use multiple services such as internet, voice calls, short message services (SMS), etc. from the WWAN.

According to an aspect of the present disclosure, one or more client devices in a given local area may be capable of taking the role of receiving paging information from a WWAN and relaying it to other client devices in the local area. The client device that may take the role of receiving the paging information from a WWAN and relaying it to other client devices is designated as Primary Client Device (PCD) and the one or more client devices receiving the paging information from the PCD in the local area are referred to as Secondary Client Devices (SCDs). Methods for establishing a PCD and an SCD in a SRWL may be in accordance with the aspects described in U.S. patent application Ser. No. 15/351,999 filed Nov. 15, 2016 and U.S. patent application Ser. No. 15/352,097 filed Nov. 15, 2016, incorporated by reference herein, for the purpose of system information decoding and relaying in a collaborative manner. In the present disclosure, the PCD and SCD are established for the purpose of paging information decoding and relaying. According to an aspect of the present disclosure, a client device may announce its capability and readiness to take the role of PCD by sending a broadcast message "PCD Request" over the SRWL. According to an aspect of the present disclosure, the one or more client devices receiving the "PCD Request" message over SRWL may determine to receive the WWAN paging information through the client device making the announcement and may send a "PCD Accept" message. After the "PCD Accept" message from one or more client devices is received by the client device that initiated the "PCD Request" message, the initiating client device may be designated as the PCD. It may broadcast its role as PCD by sending a message "PCD Confirm" to conclude the PCD establishment procedure. Once a PCD is established over a given SRWL, other client devices that accepted the established PCD are referred to as SCDs.

Figure 4:
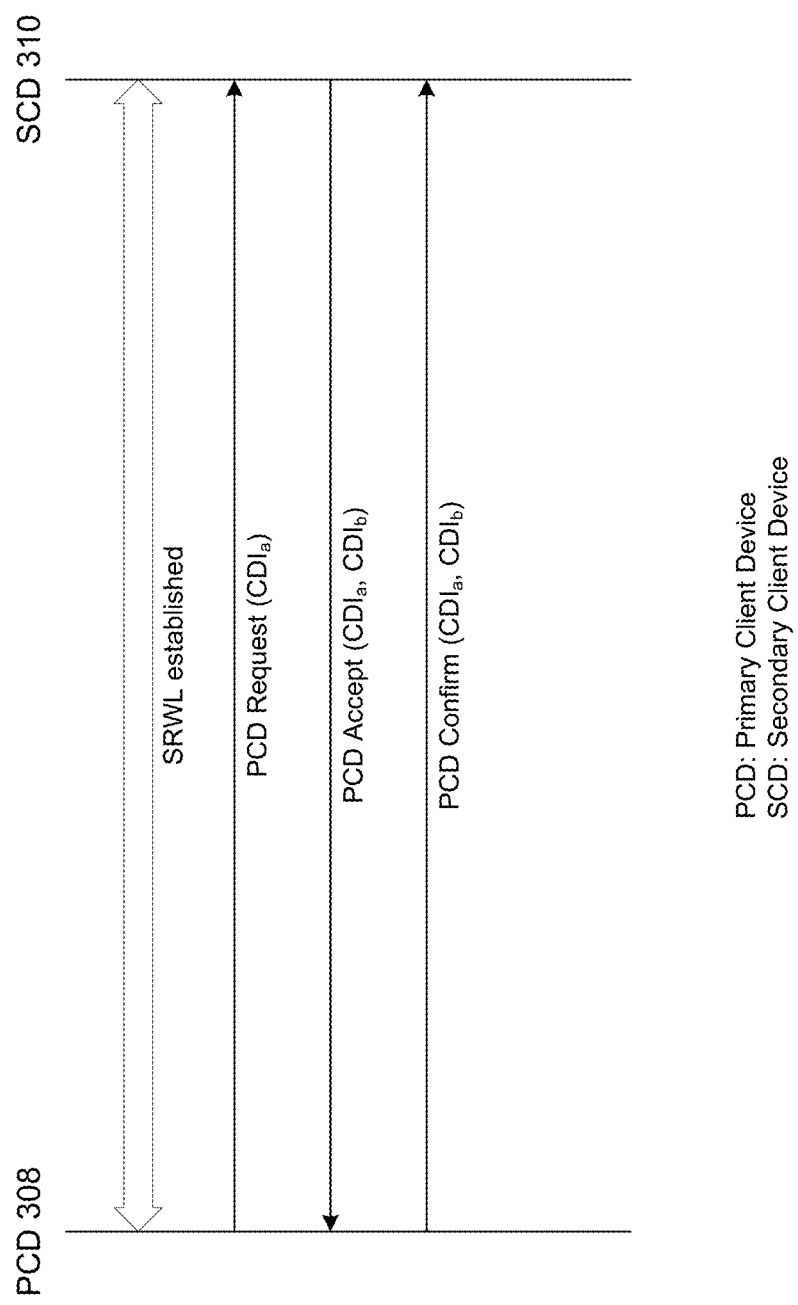
FIG. 4 illustrates a Message Sequence Chart (MSC) for an example scenario for establishing a Primary Client Device (PCD) in a Short Range Wireless Links (SRWL) according to the aspects of the present disclosure.

The Message Sequence Chart (MSC) for the messages exchanged between the client devices Smartphone 308 and the Smartphone 310 over the SRWL for establishing the PCD according to the aspects of the present disclosure is illustrated in FIG. 4. Initially, the SRWL link may be established between the client devices Smartphone 308 and the Smartphone 310 as per the protocols of the particular SRWL being used. The client device Smartphone 308 may broadcast a "PCD Request" message over the SRWL and the message may include its own CDI=$CDI_a$. The client device Smartphone 310 may receive this message and may determine to accept the Smartphone 308 as PCD and may broadcast over the SRWL the "PCD Accept" message which may include the CDI=$CDI_a$ of the Smartphone 308 and its own CDI=$CDI_b$. Upon receiving this message, the Smartphone 308 may check the first CDI that is part of the message and find that it is matching with its own CDI and may conclude that the Smartphone 310 has accepted it as a PCD. Finally, the Smartphone 308 may broadcast the "PCD Confirm" message which may include the CDI of both the Smartphone 308 and Smartphone 310. From this point forward, the Smartphone 308 may be established as the PCD for the Smartphone 310 which is established as an SCD.

According to an aspect of the present disclosure, two or more client devices may simultaneously announce their capability and readiness to take the role of PCD by sending broadcast message "PCD Request" over the SRWL. According to an aspect of the present disclosure, the one or more client devices receiving the "PCD Request" message from the multiple announcement over SRWL may determine to receive the WWAN paging information through one of the client device making the announcement and may send a "PCD Accept" message which may include the identity of the client device making the announcement. After the "PCD Accept" message from one or more client devices is received by a client device that initiated the negotiation and the message includes its identity, then it may be designated as the PCD. The client device that made the announcement and first received the acceptance message from one of the client device may broadcast its role as PCD by sending a message "PCD Confirm" to conclude the negotiation. According to an aspect of the present disclosure, in a first alternative, the other client devices that made the announcement to take the role of PCD may revoke their offer by sending a "PCD Revoke" message. According to an aspect of the present disclosure, the client devices revoking their offer may accept the PCD role of the client device that first sent the "PCD Confirm" message. According to an aspect of the present disclosure, in a second alternative, there may be multiple PCDs in a single SRWL. According to an aspect of the present disclosure, the other client devices that made the announcement to take the role of PCD may retain their offer to serve as PCD and may continue to wait for configurable time for some client devices to accept their offer. According to an aspect of the present disclosure, some client devices may accept a different client device as a PCD by sending the "PCD Confirm" message to that client device.

According to an aspect of the present disclosure, some client devices may accept multiple client devices as their PCD. According to an aspect of the present disclosure, the client device with multiple PCDs may receive the WWAN paging information from multiple PCDs. The WWAN paging information from multiple PCDs may relate to the same cell or different cells depending on whether the two or more PCDs are camped on the same cell or different cells. According to an aspect of the present disclosure, a client device having multiple PCDs may have an increased likelihood of receiving the WWAN paging information from at least one PCD. According to an aspect of the present disclosure, a client device with multiple PCDs may receive paging information from multiple PCDs and this in turn may lead to more reliable decoding of paging information from SCD's perspective.

Figure 5:
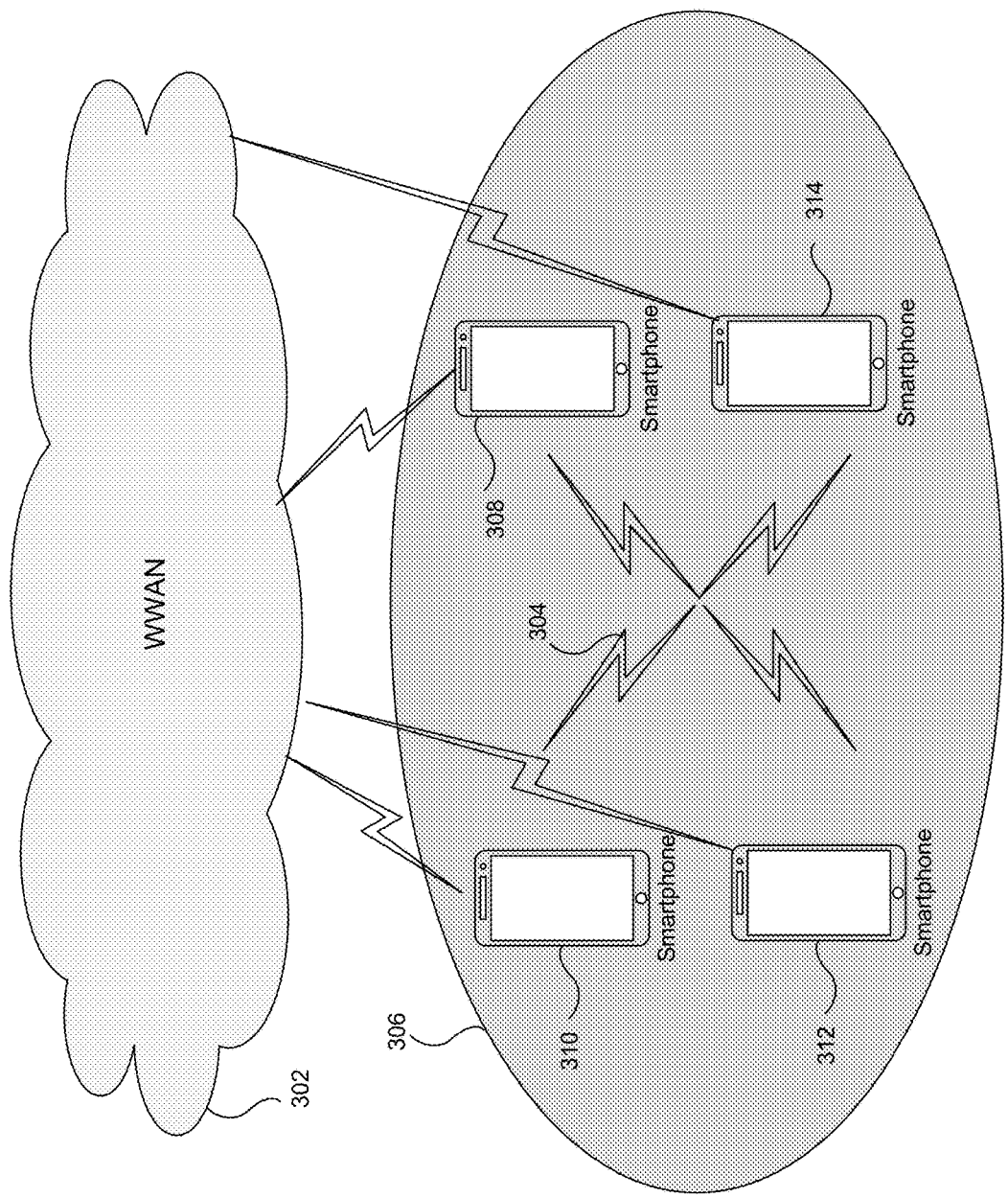
FIG. 5 illustrates a use case of more than two client devices in close proximity of each other using WWAN and SRWL.

An example of scenario is illustrated in FIG. 5 which includes the WWAN 302 and the SRWL 304 amongst the four client devices Smartphone 308, Smartphone 310, Smartphone 312 and Smartphone 314. The SRWL 304 has the coverage area 306. All four client devices are connected to the WWAN and directly with each other over the SRWL.

Figure 6:
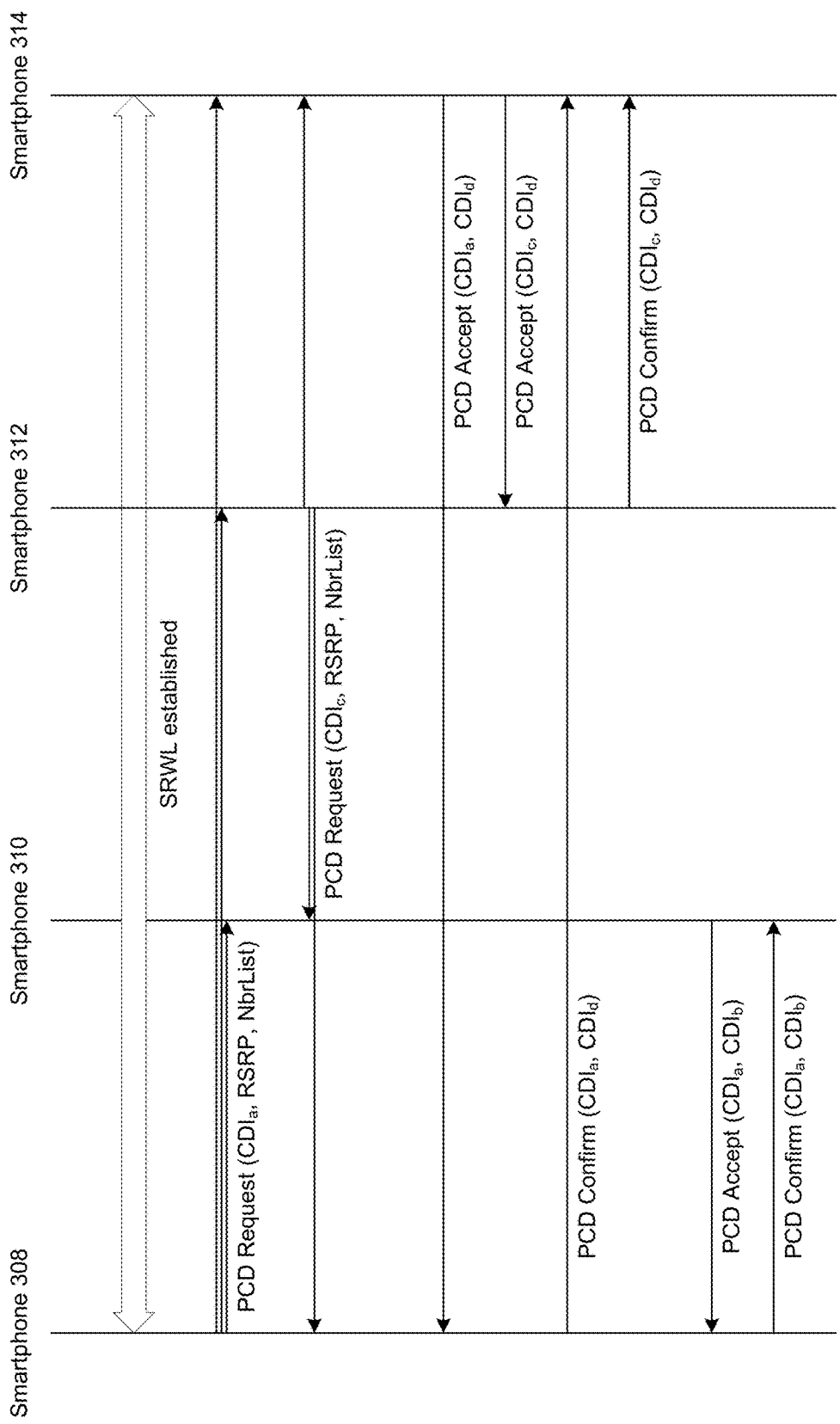
FIG. 6 illustrates an MSC for an example scenario for establishing multiple PCDs in an SRWL according to the aspects of the present disclosure.

The MSC for the case when multiple client devices simultaneously announce their capability and readiness to take the role of PCD is illustrated in FIG. 6. Initially, the SRWL link may be established amongst all four client devices as per the protocols of the particular SRWL being used. The client device Smartphone 308 may broadcast a "PCD Request" message over the SRWL and the message may include its own $CDI=CDI_a$. Immediately after that the client device Smartphone 312 may broadcast a "PCD Request" message over the SRWL and the message may include its own $CDI=CDI_c$.

The client device Smartphone 314 may receive both the "PCD Request" messages and may determine to accept both the Smartphone 308 and Smartphone 312 as PCDs and may broadcast over the SRWL two separate "PCD Accept" messages which may include the CDI pair ($CDI_a$, $CDI_d$) and the pair ($CDI_c$, $CDI_d$), where $CDI_d$ is the CDI of the Smartphone 314. Upon receiving the message with CDI pair ($CDI_a$, $CDI_d$), the Smartphone 308 may check the first CDI inside the message and find that it is matching with its own CDI and may conclude that the Smartphone 314 has accepted it as a PCD. Finally, the Smartphone 308 may broadcast the "PCD Confirm" message which may include the CDI of both the Smartphone 308 and Smartphone 314. From this point forward, the Smartphone 308 may be established as the PCD for the Smartphone 314. Similarly, upon receiving the message with CDI pair ($CDI_c$, $CDI_d$), the Smartphone 312 may check the first CDI inside the message and find that it is matching with its own CDI and may conclude that the Smartphone 314 has accepted it as a PCD. Finally, the Smartphone 312 may broadcast the "PCD Confirm" message which may include the CDI of both the Smartphone 312 and Smartphone 314. From this point forward, the Smartphone 312 may also be established as the PCD for the Smartphone 314. The client device Smartphone 310 may also receive both the "PCD Request" messages and may determine to accept only the Smartphone 308 as PCD and may broadcast over the SRWL a "PCD Accept" message which may include the CDI pair ($CDI_a$, $CDI_b$) where $CDI_b$ is the CDI of the Smartphone 310. Upon receiving the message with CDI pair ($CDI_a$, $CDI_b$), the Smartphone 308 may check the first CDI inside the message and find that it is matching with its own CDI and may conclude that the Smartphone 310 has accepted it as a PCD. Finally, the Smartphone 308 may broadcast the "PCD Confirm" message which may include the CDI of both the Smartphone 308 and Smartphone 310. From this point forward, the Smartphone 308 may be established as the PCD for the Smartphone 310.

The SCDs and/or PCDs may be mobile and may move away from the coverage area of the SRWL. According to an aspect of the present disclosure, if an SCD has multiple PCDs and the SCD moves away from the coverage area of one of its PCDs, it may continue to receive the remaining WWAN paging information from the remaining PCDs. According to an aspect of the present disclosure, if one of the PCDs moves away from an SCD, it may continue to receive the remaining WWAN paging information from the remaining PCDs.

According to an aspect of the present disclosure, a PCD may determine to end its role as a PCD and may send a "PCD Revoke" broadcast message. According to an aspect of the present disclosure, the SCDs receiving this message may first determine whether there are any remaining PCDs on the SRWL. According to an aspect of the present disclosure, if there is at least one PCD remaining on the current SRWL, the SCD may continue to receive the WWAN paging information from the remaining PCD. According to an aspect of the present disclosure, if there is no PCD remaining on the current SRWL, the client device that was previously an SCD may determine to take the role of PCD by first resuming direct WWAN paging information reception on its own and then making the announcement using the "PCD Request" message. The further protocols for establishing a PCD are as per the aspects described earlier.

According to an aspect of the present disclosure, a client device with the best received signal metric may be preferred as a PCD. According to an aspect of the present disclosure, the client device making the announcement to take the role of PCD may include its received signal metrics in the "PCD Request" message. According to an aspect of the present disclosure, the client devices receiving this message from one or more client devices may compare their received signal metrics and may choose a client device with the best received signal metric as their preferred PCD. The received signal metric may be Received Signal Strength Indicator (RSSI), Reference Signal Received Power (RSRP), Reference Signal Received Quality (RSRP), Signal to Interference and Noise Ratio (SINR), etc.

After at least one PCD is established in a given SRWL, the actual relaying of the WWAN paging information over SRWL may be performed as per the aspects of U.S. application Ser. No. 15/296,571, filed Oct. 18, 2016, incorporated by reference herein. According to an aspect of the present disclosure, the PCD and the SCD may communicate through the SRWL and may exchange their WWAN capabilities such as the RAT types supported by them. For example, the PCD and the SCD may be supporting one or more of the following RAT types: CDMA, GSM, LTE, GPRS, etc.

According to an aspect of the present disclosure, the PCD and the SCD may communicate with each other the current WWAN identity (i.e., PLMN ID), the RAT types, the CID, the TAI, the frequency of the channel, default DRX cycle or paging cycle, etc. for the cell they are camped on. If there is more than one SCD connected to the PCD, each SCD may communicate to the PCD the information about the cell it is camped on.

According to an aspect of the present disclosure, if the PCD and a SCD are currently camped on to the same cell, namely cell $C_a$, of the same RAT type, on the same frequency, then the PCD may be able to monitor and decode the paging message from the WWAN that is addressed to the SCD. At this point, according to an aspect of the present disclosure, the PCD may request and the SCD may send the information required for decoding its paging message such as SCD identity, DRX cycle, and other information that may be necessary for the PCD to derive the Paging Occasion and to successfully decode the paging record coming in the paging message from the WWAN. For example, IMSI may be used for the identity, or in case of 3GPP LTE wireless communication system, S-TMSI may be used. After PCD receives this information, according to an aspect of the present disclosure, both the PCD and SCDs may enter into Cellular Paging Decoded and Transmitted over SRWL (CPDTOS) mode in which the SCD may disable the paging message decode related processing as long as it is connected to the PCD and has entered into CPDTOS mode. According to an aspect of the present disclosure, when there is a change in the camped on cell in either PCD or SCD, then they may communicate with each other to determine whether they can continue to be in the CPDTOS mode or exit it. According to an aspect of the present disclosure, when there is more than one SCD connected to the PCD, the same procedure is followed for each SCD.

Figure 7:
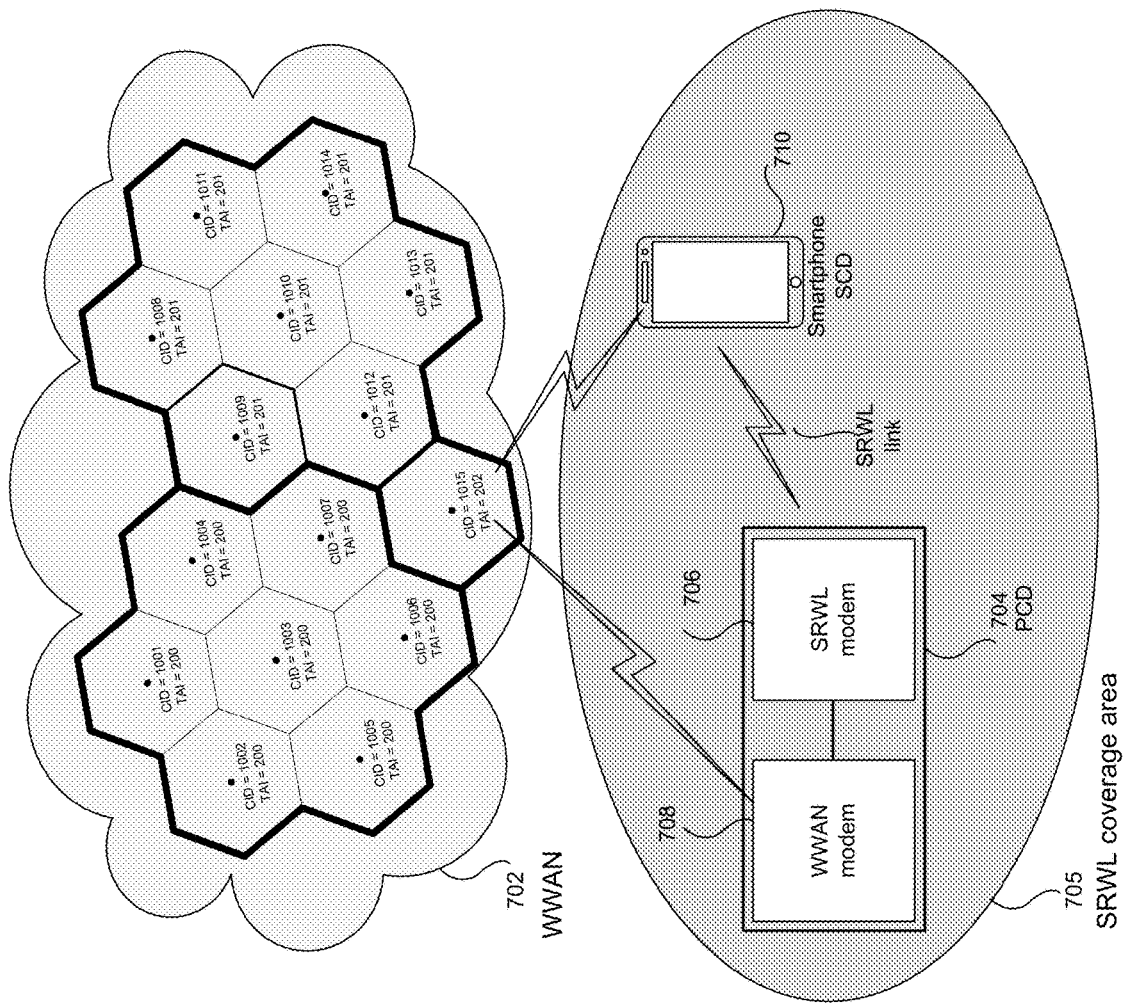
FIG. 7 illustrates an example scenario where a PCD and an SCD may be camped on the same cell of the same WWAN.
Figure 8:
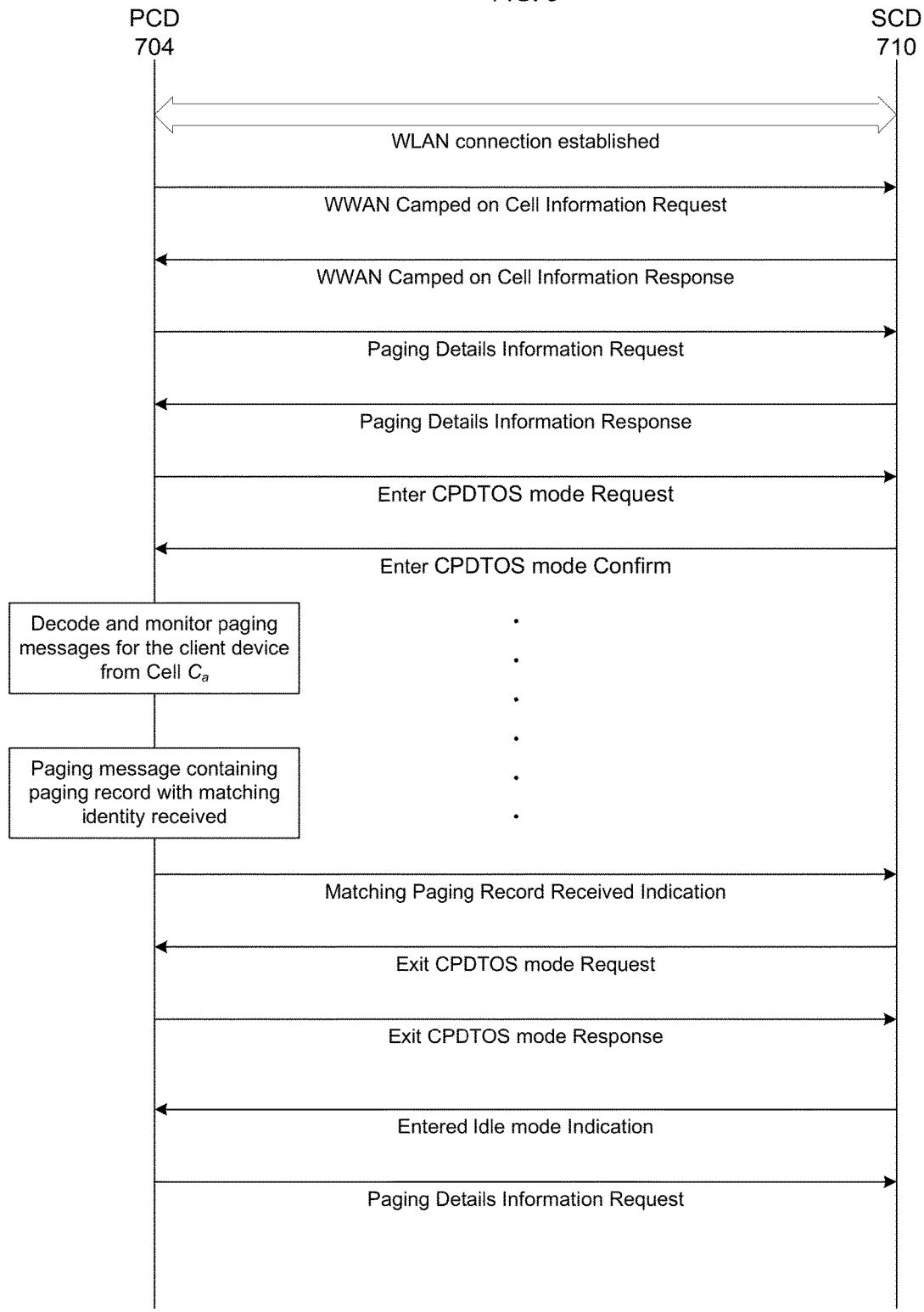
FIG. 8 illustrates a Message Sequence Chart (MSC) for an example scenario for a PCD and an SCD entering Cellular Paging Decoded and Transmitted over SRWL (CPDTOS) mode according to the aspects of the present disclosure.

FIG. 7 illustrates an example scenario for the application of present disclosure. As shown in FIG. 7, WWAN coverage area 702 and PCD coverage area 705 are illustrated. The PCD 704 comprises the WLAN Access Point (modem) 706 and WWAN modem 708. In another implementation both WLAN modem and WWAN modem may be a single unit. The WWAN modem 708 is connected to the cell with CID 1015 in the WWAN 702. The SCD 710 communicates with the PCD over the WLAN link for internet services. The SCD 710 also communicates with the cell with CID 1015 for voice calls, SMS, and other services (except internet) provided by the WWAN 702. The Message Sequence Chart (MSC) for the messages exchanged between the PCD 704 and the SCD 710 over the WLAN link for entering the CPDTOS mode according to the aspects of the present disclosure is illustrated in FIG. 8. The two entities PCD 704 and the SCD 710 involved in the message exchanges are illustrated at the top. Initially, the WLAN link between the two entities may be established. Next the PCD 704 may send the "WWAN Camped-on Cell Information Request" message to the SCD 710 which in return may send the "WWAN Camped on Cell Information Response" message which may include the CID, TAI, frequency, the RAT type, and the PLMN ID of the cell on which the SCD 710 is camped on. Upon receipt of this information, the PCD 704 may compare it with the corresponding information about the cell it is camped on. In the present example, as illustrated in FIG. 7, both the PCD 704 and the SCD 710 are camped on the same cell, namely cell $C_a$ with CID=1015. Therefore, the PCD 704 may conclude that it may be possible to enter the CPDTOS mode. Next the PCD 704 may send the "Paging Details Information Request" message to the SCD 710 which in return may send the "Paging Details Information Response" message which may include the DRX cycle, IMSI, S-TMSI, etc. for the cell on which the SCD 710 is camped on. Upon receipt of this information, the PCD 704 may compare it with the corresponding information about the cell it is camped on and its own WWAN modem parameters such as DRX cycle. Based on the available information, the PCD 704 may conclude that it is possible to enter the CPDTOS mode and may send a message "Enter CPDTOS mode Request" message to the SCD 710 which in turn may accept the request and send the "Enter CPDTOS mode Confirm" message to the PCD 704. At this point, the PCD 704 may start monitoring the PO determined according to the information received in the Paging Details Information Response and decode the paging messages, and in the decoded paging message look for paging records matching with the identity of SCDs that have entered the CPDTOS mode. If there is no match, the PCD 704 may take no further action. If there is a paging record with matching identity, the PCD 704 may send a "Matching Paging Record Received Indication" message to the SCD 710 which may analyze the received paging record and take further action as per the contents of the received paging record. For example, the paging record may indicate an incoming voice call. In such a case, the SCD may determine to initiate the procedures required for establishing a connection with the respective WWAN. As the SCD may exit its idle mode of operation, it may determine to exit the CPDTOS with the PCD 704 and send the "Exit CPDTOS mode Request" message. Upon reception of this message, the PCD may send the "Exit CPDTOS mode Response" message to the SCD 710 and may stop monitoring and decoding the PO corresponding to the SCD. According to an aspect of the present disclosure, when the SCD 710 reenters idle mode, the SCD 710 may send "Entered Idle mode Indication" message to the PCD. According to an aspect of the present disclosure when the PCD 704 receives the "Entered Idle mode Indication" from SCD 710 the PCD 704 may send "Paging Details Information Request" to obtain the updated information from SCD 710 and which in return may send the "Paging Details Information Response" message which may include the DRX cycle, IMSI, S-TMSI, etc. for the cell on which the SCD 710 is newly camped on. Upon receipt of this information, the PCD 704 may compare it with the corresponding information about the cell it is camped on and its own WWAN modem parameters such as DRX cycle. Based on the available information, the PCD 704 may conclude that it is possible to enter the CPDTOS mode and may send a message "Enter CPDTOS mode Request" message to the SCD 710 which in turn may accept the request and send the "Enter CPDTOS mode Confirm" message to the PCD 704. At this point, the PCD 704 may start monitoring the PO determined according to the information received in the Paging Details Information Response and may decode the paging messages.

According to an aspect of the present disclosure, multiple SCDs may be connected to the PCD over the SRWL and the PCD may be able to enter the CPDTOS mode with more than one SCD concurrently. According to an aspect of the present disclosure, the PCD may receive the "Paging Details Information Response" message from multiple SCDs. According to an aspect of the present disclosure, after receiving the "Paging Details Information Response" messages, the PCD may derive the PO time instances for all the SCDs that sent the response. According to an aspect of the present disclosure, if the derived PO time instances are not overlapping with each other or with other scheduled downlink processing for WWAN at the PCD, then the PCD may send the "Enter CPDTOS mode Request" message to all the SCDs to enter the CPDTOS mode. According to an aspect of the present disclosure for the SCDs camped on to the same cell, namely cell $C_a$, of the same RAT type, on the same frequency, if one or more of the derived PO time instances are overlapping with other PO time instances at the PCD, then the PCD may use single PO time instance to decode more than one SCD paging message and may send a "Enter CPDTOS mode Request" message to the SCDs that have overlapping PO time instances as well along with sending the "Enter CPDTOS mode Request" messages only to the SCDs that do not have overlapping PO time instances.

Figure 9:
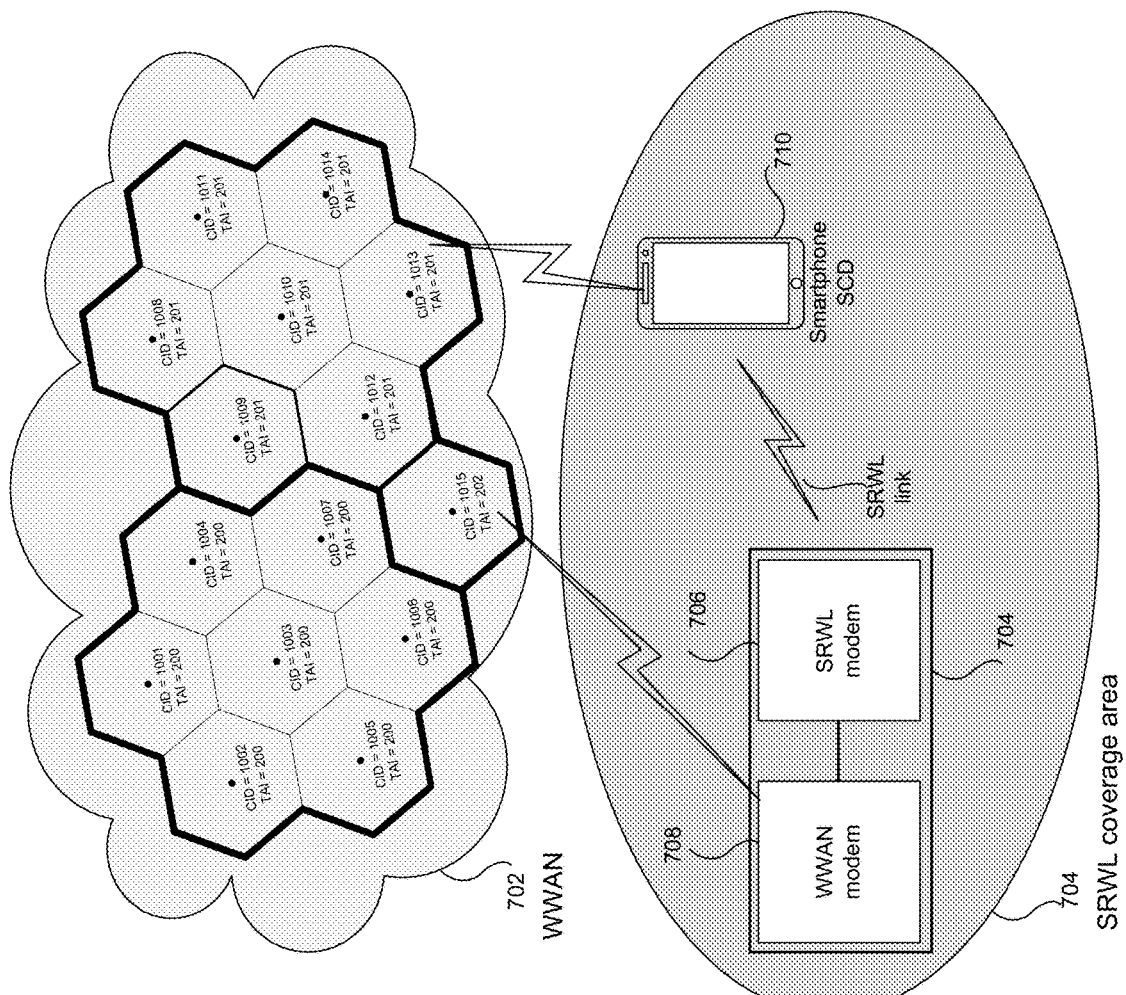
FIG. 9 illustrates an example scenario where a PCD and an SCD may be camped on different cells of the same WWAN.

According to an aspect of the present disclosure, if the PCD and one or more SCDs are currently camped on to the cells of the same RAT type, on the same frequency but on different cells, namely $C_a$ and $C_b$ respectively, then the PCD may first determine whether it can decode the paging messages from cell $C_b$. According to an aspect of the present disclosure, if the PCD determines that it cannot decode the paging messages from cell $C_b$ then it may not initiate entry into CPDTOS mode for the SCD camped on the cell $C_b$. In general, if the PCD determines that it cannot decode the paging messages from cells on which the SCDs are camped, then it may not initiate entry into CPDTOS mode for the SCDs which are camped on cells different from that of the PCD. Note that a subset of the SCDs that may be camped on the same cell as the PCD may continue to remain in or may enter the CPDTOS mode. According to an aspect of the present disclosure, if the PCD determines that it can decode the paging messages from cell $C_b$ then the PCD may initiate entry into CPDTOS mode for the SCDs camped on the cell $C_b$ by sending "Enter CPDTOS mode Request" to the SCDs and the SCDs may send the "Enter CPDTOS mode Confirm" message to the PCD. Once the PCD receives the "Enter CPDTOS mode Confirm" message from the SCDs the PCD may decode the paging messages in the respective PO time instances and may look for paging records matching with the SCD's identity in the decoded paging message. If there is no match, the PCD 704 may take no further action. If there is a paging record with matching identity, the PCD 704 may send a "Matching Paging Record Received Indication" message to the SCD 710. The SCD 710 may analyze the received paging record and take further action as per the contents of the received paging record. For example, the paging record may indicate an incoming voice call. In such case, the SCD may determine to initiate the procedures required for establishing a connection with the respective WWAN. As the SCD may exit its idle mode of operation, it may determine to exit the CPDTOS with the PCD 704 and send the "Exit CPDTOS mode Request" message. Upon reception of this message, the PCD may send the "Exit CPDTOS mode Response" message to the SCD 710 and may stop monitoring and decoding the PO corresponding to the SCD. Subsequently, when the SCD 710 reenters idle mode, it may enter CPDTOS mode with the PCD 704. Note that CPDTOS mode may be determined on a per cell and per SCD basis, According to an aspect of the present disclosure, the SCDs may disable the monitoring and decoding the PO as long as they are connected to the PCD and have entered the CPDTOS mode. According to an aspect of the present disclosure, when there is a cell reselection in either PCD or one or more of the SCDs then they may communicate with each other to determine whether they can continue to be in the CPDTOS mode or exit the CPDTOS mode. FIG. 9 illustrates an example scenario for the application of present disclosure where the PCD 704 is camped on the cell $C_a$ with CID 1015 and the SCD 710 is camped on the cell $C_b$ with CID 1013.

Figure 10:
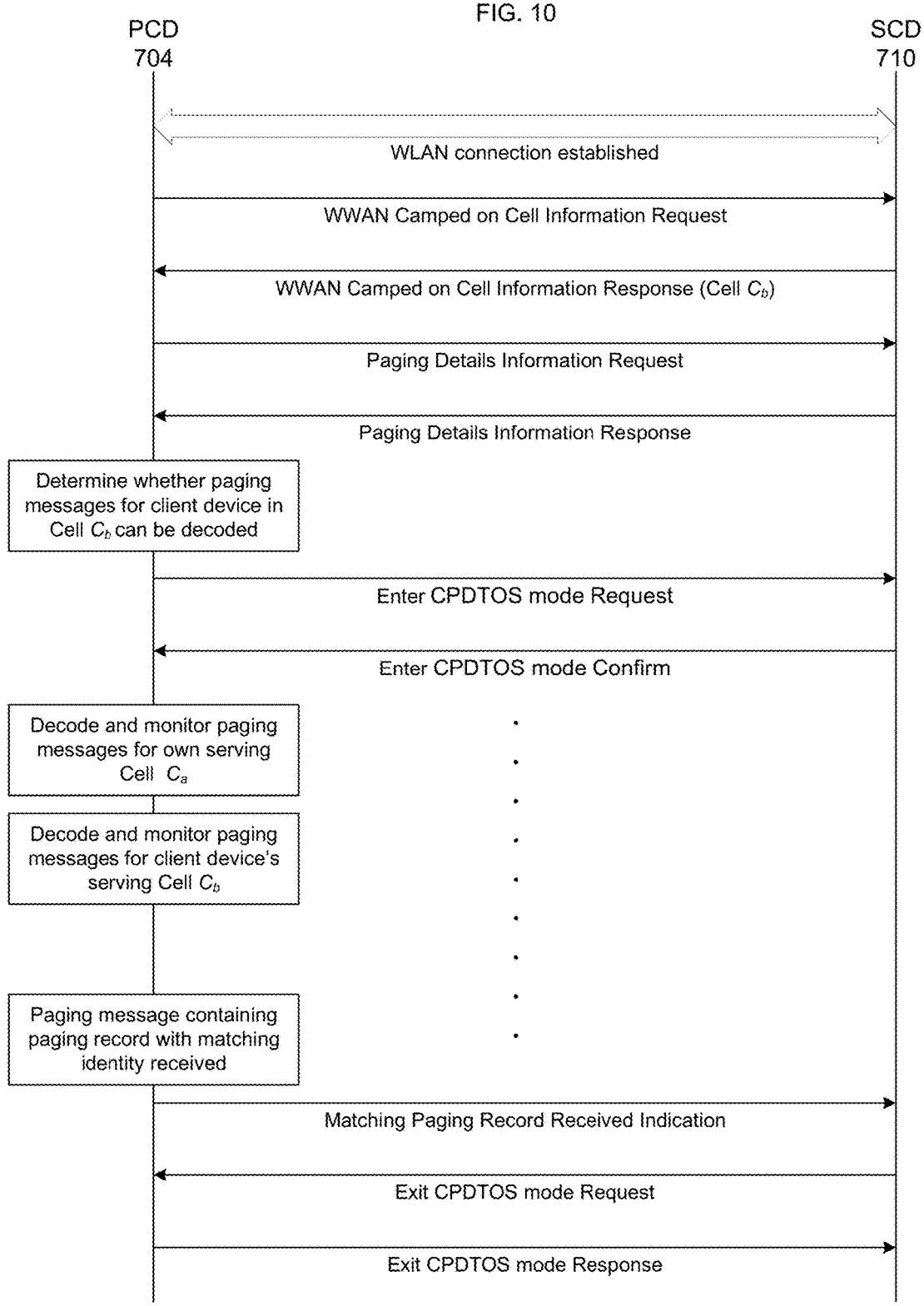
FIG. 10 illustrates an MSC for an example scenario for a PCD and an SCD entering CPDTOS mode when they are camped on different cells according to the aspects of the present disclosure.

The MSC for the messages exchanged between the PCD 704 and the SCD 710 over the WLAN link for entering the CPDTOS mode when they are camped on different cells of the same frequency, RAT type, and PLMN according to the aspects of the present disclosure are illustrated in FIG. 10. The message exchanges are similar to the case illustrated in FIG. 8 for the case when both the PCD and the SCD are camped on the same cell. The key difference is that the PCD 704 first determines whether it can decode the paging information from cell $C_b$ or not and if it can do so then according to an aspect of the present disclosure the PCD may decode a paging message from cell $C_b$ to decide and confirm that it could actually decode the paging message. According to an aspect of the present disclosure only after the PCD 704 has successfully decoded a paging message from the cell $C_b$, the PCD 704 may send the "Enter CPDTOS mode Request" message to the SCD 710. According to an aspect of the present disclosure if the PCD has known priori information about the cell $C_b$ and if the PCD knows that it can decode the paging message in cell $C_b$ then without waiting to decode any paging message the PCD 704 may send the "Enter CPDTOS mode Request" message to the SCD 710. Subsequently, after having entered the CPDTOS mode, the PCD 704 may continue to monitor the PO time instances of the SCD in cell $C_b$. The PCD may decode the paging messages in the respective PO time instances and in the decoded paging message look for paging records matching with the SCD's identity. If there is no match, the PCD 704 may take no further action. If there is a paging record with matching identity, the PCD 704 may send a "Matching Paging Record Received Indication" message. The SCD 710 may analyze the received paging record and take further action as per the contents of the received paging record. For example, the paging record may indicate an incoming voice call. In such case, the SCD may determine to initiate the procedures required for establishing a connection with the respective WWAN. As the SCD may exit its idle mode of operation, it may determine to exit the CPDTOS with the PCD 704 and send the "Exit CPDTOS mode Request" message. Upon reception of this message, the PCD 704 may send the "Exit CPDTOS mode Response" message to the SCD 710 and may stop monitoring and decoding the PO corresponding to the SCD. Subsequently, when the SCD 710 reenters idle mode, it may enter CPDTOS mode with the PCD 704.

According to an aspect of the present disclosure, if the PCD and one or more SCDs are currently camped on to the cells of the same RAT type but different frequencies, namely cells $C_{f1}$ and $C_{f2}$ respectively, then PCD may first determine whether it can decode the paging messages from the cell $C_{f2}$ which may require the PCD to tune to frequency f2 of the cell $C_{f2}$ on which the SCD camped while monitoring its own serving cell frequency f1. According to an aspect of the present disclosure, if the PCD determines that it cannot decode the paging messages from cell $C_{f2}$ then it may not initiate entry into CPDTOS for the SCD camped on the cell $C_{f2}$. In general, if the PCD determines that it cannot decode the paging messages from cells of different frequencies on which the SCDs are camped, then it may not initiate entry into CPDTOS mode for the SCDs which are camped on cells using different frequencies from that of the PCD. Note that a subset of the SCDs that may be camped on the same cell as the PCD and SCDs that may be camped on different cells but with the same frequency as the PCD may continue to remain in the CPDTOS mode. According to an aspect of the present disclosure, if the PCD determines that it can decode the paging messages from the cell C then the PCD and SCDs may enter the CPDTOS mode and the PCD may monitor the POs and decode the paging messages from the cell $C_{f2}$. The PCD may decode the paging messages in the respective PO time instances and in the decoded paging message look for paging records matching with the SCD's identity. If there is no match, the PCD 704 may take no further action. If there is a paging record with matching identity, the PCD 704 may send a "Matching Paging Record Received Indication" message to the SCD 710. The SCD 710 may analyze the received paging record and take further action as per the contents of the received paging record. For example, the paging record may indicate an incoming voice call. In such a case, the SCD may determine to initiate the procedures required for establishing a connection with the respective WWAN. As the SCD may exit its idle mode of operation, it may determine to exit the CPDTOS with the PCD 704 and send the "Exit CPDTOS mode Request" message. Upon reception of this message, the PCD 704 may send the "Exit CPDTOS mode Response" message to the SCD 710 and may stop monitoring and decoding the PO corresponding to the SCD. Subsequently, when the SCD 710 reenters idle mode, it may enter CPDTOS mode with the PCD 704. Note that CPDTOS mode may be determined on per cell and per SCD basis. According to an aspect of the present disclosure, the SCDs may disable the paging message decoding as long as they are connected to the PCD and have entered the CPDTOS mode. According to an aspect of the present disclosure, when there is a cell reselection in either PCD or one or more of the SCDs then they may communicate with each other to determine whether they can continue to be in the CPDTOS mode or exit the CPDTOS mode.

According to an aspect of the present disclosure, if the PCD and one or more SCDs are currently camped on to the cells of different RAT type, namely cells $C_{RAT1}$ and $C_{RAT1}$ respectively, then PCD may first determine whether it supports the RAT2 used by the SCDs and whether it supports the particular frequencies used by the RAT2, and whether it can decode the paging messages from the cell $C_{RAT2}$ which may require the PCD to tune to the frequency of the cell $C_{RAT2}$ of the cell camped on by one or more SCDs while monitoring its own serving cell $C_{RAT1}$ of RAT type RAT1. According to an aspect of the present disclosure, if the PCD determines that it cannot decode the paging messages for SCDs from the cell $C_{RAT2}$ then it may not initiate the CPDTOS mode for those SCDs which are camped on cells using different RAT type RAT2 from that of the PCD. Note that a subset of the SCDs that may be camped on the same cell as the PCD and SCDs that may be camped on different cells with the same and/or different frequency but the same RAT type as the PCD may continue to remain in or enter the CPDTOS mode. According to an aspect of the present disclosure, if the PCD determines that it can decode the paging messages for the SCDs from the cell $C_{RAT2}$ then the PCD and SCDs may enter the CPDTOS mode and the PCD may decode the paging messages in the respective PO time instances and in the decoded paging message look for paging records matching with the SCD's identity. If there is no match, the PCD 704 may take no further action. If there is a paging record with matching identity, the PCD 704 may send a "Matching Paging Record Received Indication" message to the SCD 710. The SCD 710 may analyze the received paging record and take further action as per the contents of the received paging record. For example, the paging record may indicate an incoming voice call. In such case, the SCD may determine to initiate the procedures required for establishing a connection with the respective WWAN. As the SCD may exit its idle mode of operation, it may determine to exit the CPDTOS with the PCD 704 and send the "Exit CPDTOS mode Request" message. Upon reception of this message, the PCD may send the "Exit CPDTOS mode Response" message to the SCD 710 and may stop monitoring and decoding the PO corresponding to the SCD. Subsequently, when the SCD 710 reenters idle mode, it may enter CPDTOS mode with the PCD 704. Note that CPDTOS mode may be determined on per cell and per SCD basis. According to an aspect of the present disclosure, the SCDs may disable paging message decoding related processing as long as they are connected to the PCD and have entered the CPDTOS mode. According to an aspect of the present disclosure, when there is a cell reselection in either PCD or one or more of the SCDs then they may communicate with each other to determine whether they can continue to be in the CPDTOS mode or exit the CPDTOS mode.

According to an aspect of the present disclosure, for the cases where the PCD agrees with the SCDs on monitoring and decoding paging messages for the SCDs camped on the same cells or different cells that may be on different frequencies or different RAT types, the PCD may monitor POs in the downlink for all the agreed upon cells of different frequencies and RAT types. The PCD may manage its downlink monitoring schedule accordingly for respective cells.

Note that a change in the DRX cycle typically may change the PO for the SCDs in that particular network. According to an aspect of the present disclosure, if the PCD finds an overlap in the POs of different cells in the same or different frequencies and RAT types, then it may request the affected one or more SCDs to change their DRX cycle through the "Paging Details Information Request" message to determine whether the change in DRX cycle could change the POs such that the POs overlap may be avoided. The one or more SCDs may change their DRX cycle and inform the PCD using the "Paging Details Information Response" message. According to an aspect of the present disclosure, if the PCD could not find any non-overlapping POs for the SCDs camped on cells of the same or different frequencies and RAT types, then the PCD may communicate the same to the affected SCDs and may not enter CPDTOS mode or exit the CPDTOS mode for those SCDs.

According to an aspect of the present disclosure, when the PCD attempts to decode paging message for one or more SCDs camped on cells of the same or different frequencies and RAT types, it may find an overlap with POs of cells of the same or different frequencies and RAT types to be monitored for SCDs with which it has entered in CPDTOS mode. In such a case, one of the four alternative methods as described next may be used.

Figure 11:
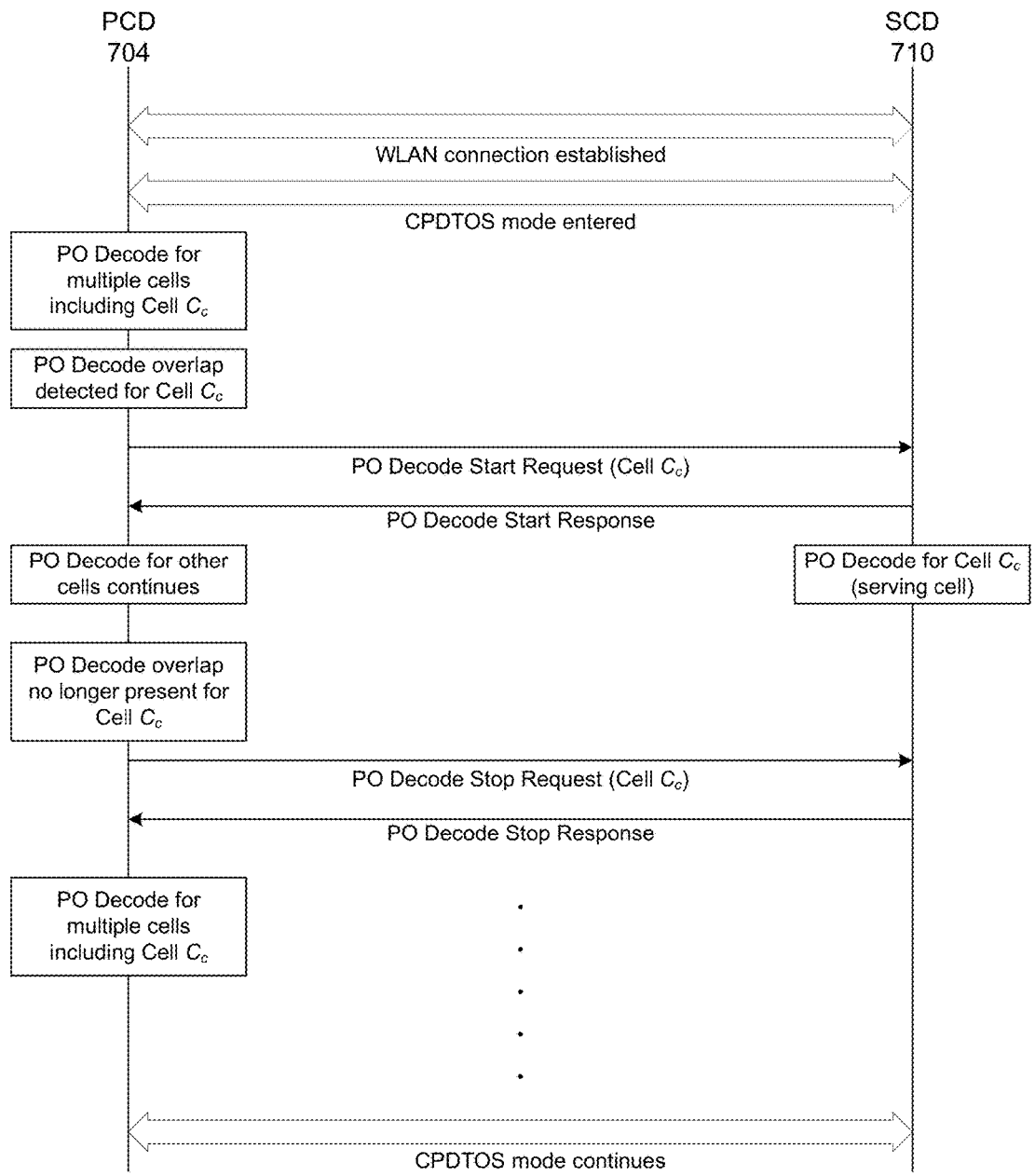
FIG. 11 illustrates an MSC for an example scenario for the handling of Paging Occasion (PO) overlap in a PCD followed by a client device performing PO decoding and then eventual removal of PO overlap according to the aspects of the present disclosure.

According to an aspect of the present disclosure, in the first alternative, the PCD may first prioritize the cells of the same frequency and RAT type in which the PCD is camped on. According to an aspect of the present disclosure, for the cells on other frequencies and RAT types, for which the PCD sees an overlap of the POs of certain SCDs, the PCD may communicate to those SCDs that it may not be able to decode the next PO for those SCDs and may request the SCDs to perform the PO decode by themselves and, according to an aspect of the present disclosure, the PCD may continue to be in CPDTOS mode with those SCD. This example scenario is illustrated in the MSC contained in FIG. 11. At the beginning, the PCD 704 and the SCD 710 have already entered into the CPDTOS mode. At this point, the PCD may monitor the PO for all the required cells including the inter-frequency cell $C_c$ on which the SCD 710 may be camped. Subsequently, for the current example scenario, the SI of the serving cell of the PCD may change which may lead to PO overlap for the inter-frequency cell $C_c$. At this time, the PCD may send the "PO Decode Start Request" message to the SCD 710 which may accept the request and send the "PO Decode Start Response" message to the PCD. Subsequently, the PCD 704 and the SCD 710 may continue to decode their respective PO's. Subsequently, the SI of the serving cell of the PCD may change which may lead to the removal of the PO overlap for the inter-frequency cell $C_c$. At this time, the PCD 704 may send the "PO Decode Stop Request" message to the SCD 710 which may accept the request and send the "PO Decode Stop Response" message to the PCD. From this point forward, the PCD may continue to monitor the PO for all the required cells and the SCD 710 may not monitor its own PO on its cell $C_c$.

Figure 12:
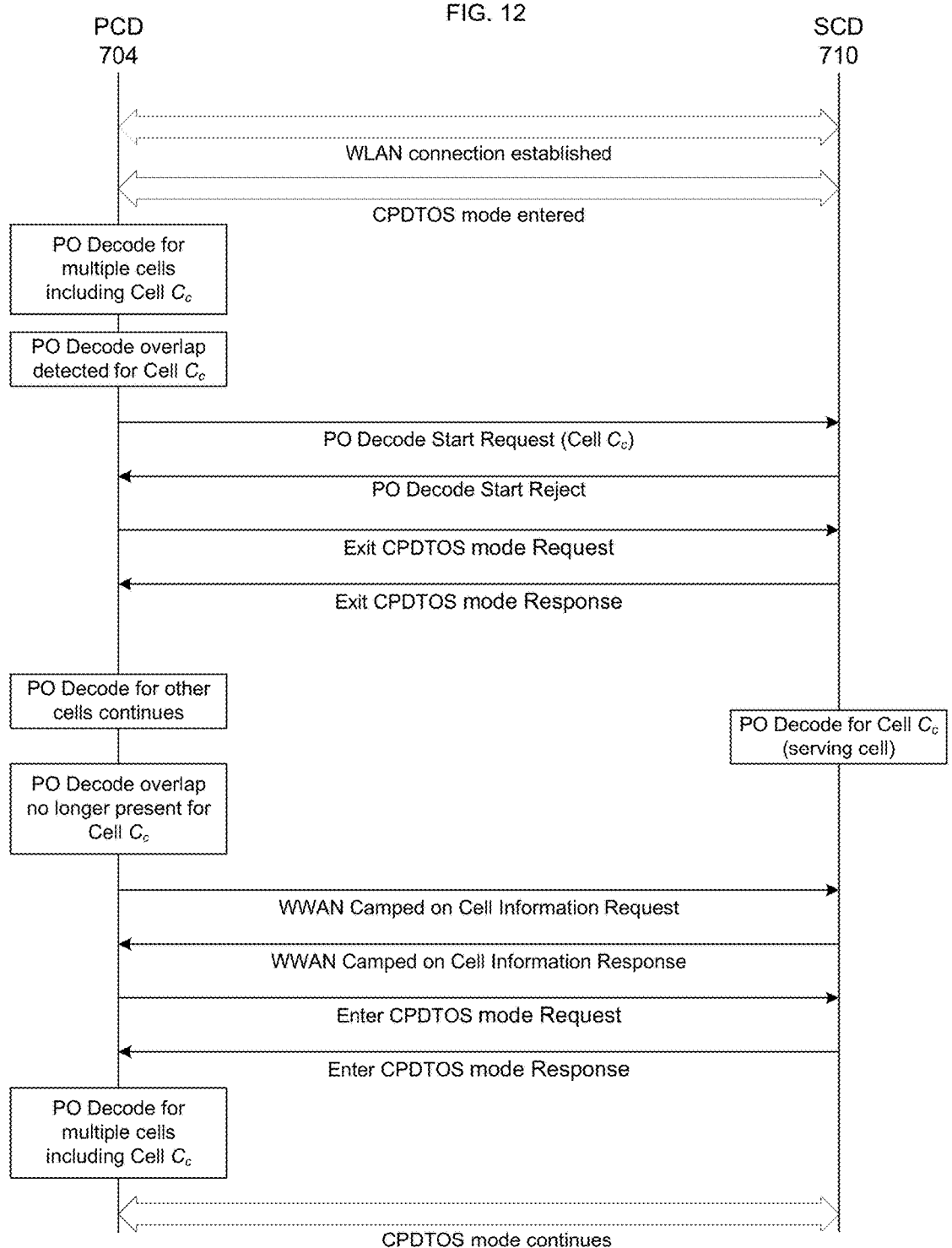
FIG. 12 illustrates an MSC for an example scenario for the handling of PO overlap in a PCD followed by a client device rejecting PO decoding and then eventual removal of PO overlap according to the aspects of the present disclosure.

According to an aspect of the present disclosure, if the SCD denies the request from the PCD for decoding the PO and to continue to be in CPDTOS mode, then the PCD may exit the CPDTOS mode with the SCD and the SCD may perform normal PO decode by itself. According to an aspect of the present disclosure, the PCD, after completing its own ongoing SI decode, if it finds the non-overlapping POs for one or more of SCDs for which it previously exited the CPDTOS mode or could not enter the CPDTOS mode because of the overlap in the PO in the past due to SI decode, the PCD may send either "WWAN Camped on Cell Information Request" or "Enter CPDTOS mode request" to one or more of such SCDs to request them to enter the CPDTOS mode. This example scenario is illustrated in the MSC contained in FIG. 12. At the beginning, the PCD 704 and the SCD 710 have already entered into the CPDTOS mode. At this point, the PCD 704 monitors the PO for all the required cells and SCDs including the inter-frequency cell $C_c$ on which the SCD 710 may be camped. Subsequently, the SI of the serving cell of the PCD may change which may lead to PO overlap for the inter-frequency cell $C_c$. At this time, the PCD 704 may send the "PO Decode Start Request" message to the SCD 710 which may not accept the request and send the "PO Decode Start Reject" message to the PCD. At this time, the PCD 704 may send the "Exit CPDTOS mode Request" message to the SCD 710 which may accept the request and send the "Exit CPDTOS mode Response" message to the PCD. Subsequently, the PCD may continue to decode the POs for remaining required cells and SCDs. The SCD 710 may take necessary steps, including possibly acquiring updated SI, etc., to resume PO decoding on its own. Subsequently, the SI of the serving cell of the PCD may change which may lead to the removal of the PO overlap for the inter-frequency cell $C_c$. At this time, the PCD 704 may send the "Paging Details Information Request" message to the SCD 710 which may accept the request and send the "Paging Details Information Response" message to the PCD. The PCD 704 may conclude that it is possible to enter the CPDTOS mode and may send a message "Enter CPDTOS mode Request" message to the SCD 710 which in turn may accept the request and send the "Enter CPDTOS mode Confirm" message to the PCD. From this point forward, the PCD may continue to monitor the PO for all the required cells and SCDs while the SCD 710 may not monitor its own PO on the cell $C_c$.

According to an aspect of the present disclosure, in the second alternative, the PCD may prioritize the PO decoding of cells of other frequencies and RAT types, since PO decoding may be typically a higher priority and the PCD may defer the SI decode for cells on its camped on frequency and RAT type. This may be a preferred alternative as there is usually periodic broadcast of SIs from each cell of the same or different frequencies and RAT types. According to an aspect of the present disclosure, the PCD may determine to defer the SI decode if the delayed decoding of SI may not impact the normal operation and performance of the PCD.

According to an aspect of the present disclosure, in the third alternative, the SCD may give "priority request" based on its current state such as battery level to the PCD for PO monitoring. For example, in case of battery operated SCDs with low battery level and which may need more power saving may set higher priority for its PO monitoring when compared to the SCDs with more battery power or the SCDs which may not worry much of power save and which can monitor its own PO. According to an aspect of the present disclosure the PCD may take the "priority request" from the SCD into consideration to decide which SCDs the PO can be monitored and for which other SCDs the PO monitoring can be cancelled. According to an aspect of the present disclosure the SCD may communicate the "priority request" in the "Paging Details Information Response" message.

According to another aspect of the present disclosure, in the fourth alternative the PCD may be preconfigured with the priorities set on SCDs and/or the RAT types and/or the frequencies for PO monitoring. When the PCD detects the PO overlap then the PCD may use the preconfigured priorities to decide which SCD PO can be monitored and which SCD PO monitoring can be cancelled.

Figure 13:
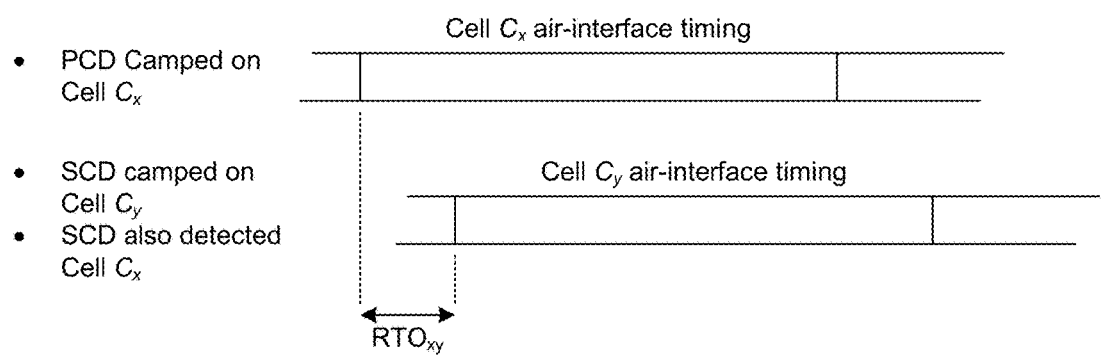
FIG. 13 illustrates the timing of a cell camped on by a PCD and a cell camped on by an SCD and the Relative Timing Offset (RTO) between the timing of the two cells.

Typically in any SCD a relative time offset is maintained for the detected cells with respect to the currently camped on cell. According to an aspect of the present disclosure the PCD may share its currently camped on the cell G information such as RAT type, frequency, CID to the SCD in "WWAN Camped-on Cell Information Request" message. According to an aspect of the present disclosure, if the SCD has the relative time offset of its camped on the cell $C_y$ with respect to the PCD camped on cell $C_x$ then the SCD may estimate the relative time offset "$RTO_{xy}$" as illustrated in FIG. 13 and may provide it to the PCD in "WWAN Camped-on Cell Information Response" message. According to an aspect of the present disclosure the PCD may use the relative time offset "$RTO_{xy}$" given by the SCD to expedite the timing synchronization with the cell $C_y$ and thereby may do faster paging message decode in cell $C_y$.

According to an aspect of the present disclosure, when a PCD may be built with multiple (for example, M) receiver/decoder circuits, it may decode in parallel even the overlapping POs and SIs from multiple (for example, N) cells of the same or different frequencies and RAT types. Note that M and N may not necessarily be the same.

According to an aspect of the present disclosure, when a SCD goes out of coverage area of the PCD then it may exit CPDTOS mode and may start decoding the PO on its own as normal.

According to an aspect of the present disclosure, when a SCD disconnects with the PCD then it may exit CPDTOS mode and may start decoding the PO on its own as normal.

According to an aspect of the present disclosure, the PCD at any point of time may communicate to SCDs and may exit CPDTOS mode.

According to an aspect of the present disclosure, if the PCD fails to decode the paging message in any PO then it may notify the impacted SCDs and may exit CPDTOS mode with the respective SCDs.

According to an aspect of the present disclosure when the PCD decodes the paging messages in the respective PO time instances and in the decoded paging message if there is no match in the paging record for identities respectively of certain SCDs, the PCD 704 may send a "No Matching Paging Record Received Indication" message to the applicable SCDs. This may enable the SCDs to refresh various counters and timers, such as "keep-alive timer", to continue to maintain its status with the WWAN. It is to be noted that the PCD may receive a single paging message in a PO instance and the paging message may carry matching paging records for more than one SCD which are in CPDTOS mode with the PCD. Also it may be possible that more than one SCD may be expected to receive the paging message with matching paging record in a single PO instance, but in a given PO instance the paging message may carry one or more or none of the matching paging records. In such a case, according to the aspect of the present disclosure, the PCD may send "Matching Paging Record Received Indication" message to the SCDs for which the matching paging record was detected in the paging message and the PCD may send "No Matching Paging Record Received Indication" message to the SCDs for which the matching paging record was not received in the paging message.

According to an aspect of the present disclosure, the PCD may enter CPDTOS mode autonomously and may start broadcasting "Paging Details Information Request" message. The PCD may do this whenever a new SCD gets connected to it. The PCD may also do this whenever there is an update or change in SI in its serving cell and the PCD successfully decodes the updated SI. This may enable timely determination of whether CPDTOS mode can be continued or not.

According to an aspect of the present disclosure, the PCD may be pre-configured with a set of cells of the same or different frequencies, and RAT type for which it is expected to monitor and/or decode POs from the respective cells.

According to an aspect of the present disclosure, the PCD may obtain the Matching Paging Record Received Indication using an application which may run in the PCD and in the SCDs and the applications on the two entities may communicate through a peer to peer protocol on any logical channel of the underlying SRWL being used. According to an aspect of the present disclosure, the peer to peer application may be independent of the particular SRWL being used and it may be achieved through a virtual communication port established in both PCD and in the SCDs. The SRWL connection may be mapped to the virtual communication port and the applications may communicate using the virtual communication port. For example, in case of WLAN SRWL, it could be a Transmission Control Protocol/Internet Protocol (TCP/IP) socket based communication between the PCD and the SCDs.

According to an aspect of the present disclosure, the PCD and the SCDs may create a new physical or logical channel, namely Cellular Paging Message Communication Channel (CPMCC), which may be pre-negotiated and dedicated for the CPDTOS mode information exchange. This CPMCC may be defined with a periodicity and time slot where the PCD may broadcast the Matching Paging Record Received Indication and the SCDs may monitor the CPMCC on a pre-defined agreed upon periodicity and time slot to receive the paging record from the PCD. According to an aspect of the present disclosure the PCD and the SCD may use the CPMCC for other cellular network information exchange (other than Matching Paging Record Received Indication) between the SCD and the PCD.

According to an aspect of the present disclosure, when a SCD disconnects from the PCD and if the SCD is not able to find another PCD in its current location, then SCD may start decoding the POs directly from the WWAN.

A PCD may be equipped with more than one source for primary sources of internet. For example, a PCD may be equipped with a cable modem and a WWAN modem. According to an aspect of the present disclosure, a PCD may be using the cable modem to provide internet service while it may be using the WWAN modem strictly for PO monitoring and decoding purposes, i.e., a PCD need not be using the WWAN for providing internet service in order to only monitor the POs from WWAN cells.

A SCD operating according to the aspects of the present disclosure may enter power save mode without monitoring and decoding of PO which may lead to reduced power consumption and extended battery life. According to an aspect of the present disclosure, when the SCD enters the CPDTOS mode, the SCD may turn off the RF receiver of the cellular modem during PO time slot and may enter a power save state. This may be a significant advantage for deeply embedded SCDs powered with limited capacity batteries. For the case where the PCD and SCDs are camped on the same cell of the same frequency and the same RAT type, the PCD need not do any additional decoding. This is likely to be the most common case when the PCD and SCDs have the service from the WWAN with the same PLMN. When a SCD first connects with the PCD, there is a high probability the SCD may camp on to the same cell as the PCD for getting service from the WWAN with the same PLMN.

Figure 14:
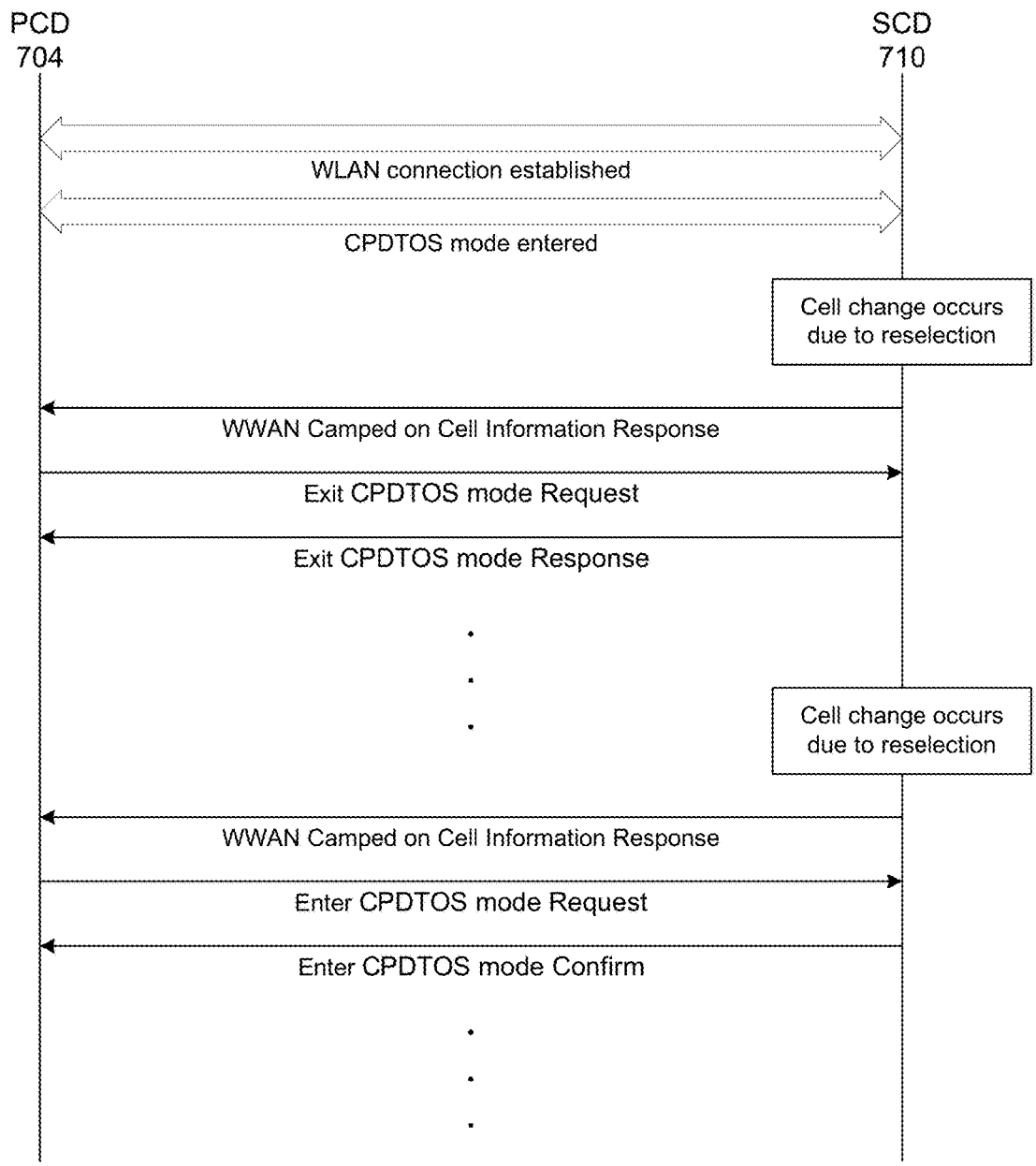
FIG. 14 illustrates an MSC for an example scenario for the handling of cell reselection by an SCD leading to the exit from CPDTOS mode followed by another reselection leading to entering of CPDTOS mode according to the aspects of the present disclosure.

According to an aspect of the present disclosure, when the PCD and the SCDs are in CPDTOS mode and if a cell change occurs in either PCD or in one or more of the SCDs and if the PCD may not able to continue the CPDTOS mode with one or more of the SCDs then the PCD may send "Exit CPDTOS mode Request" to one or more of the SCDs and may exit the CPDTOS mode with those SCDs. An example of this type of scenario is illustrated in FIG. 14 where initially the PCD 704 and the SCD 710 are in CPDTOS mode. At some point the SCD 710 may perform cell reselection and to ensure that the CPDTOS mode can be continued, it may send the "WWAN Camped on Cell Information Response" message to the PCD to update its serving cell information. The PCD 704 may determine that it may not be able to support the CPDTOS mode for the SCD 710 for the newly selected cell. Therefore, the PCD 704 may send the "Exit CPDTOS mode Request" message to the SCD 710 which may accept the request and send the "Exit CPDTOS mode Response" message to the PCD. At further later point in time, the SCD 710 may perform another cell reselection and to ensure that the CPDTOS mode can be entered, it may send the "WWAN Camped on Cell Information Response" message to the PCD to update its serving cell information. The PCD 704 may determine that it may be able to support the CPDTOS mode for the SCD 710 for the newly selected cell. Therefore, the PCD 704 may send the "Enter CPDTOS mode Request" message to the SCD 710 which may accept the request and send the "Enter CPDTOS mode Response" message to the PCD. From this point forward, the PCD may continue to monitor the POs for the serving cell of the SCD 710.

Figure 15:
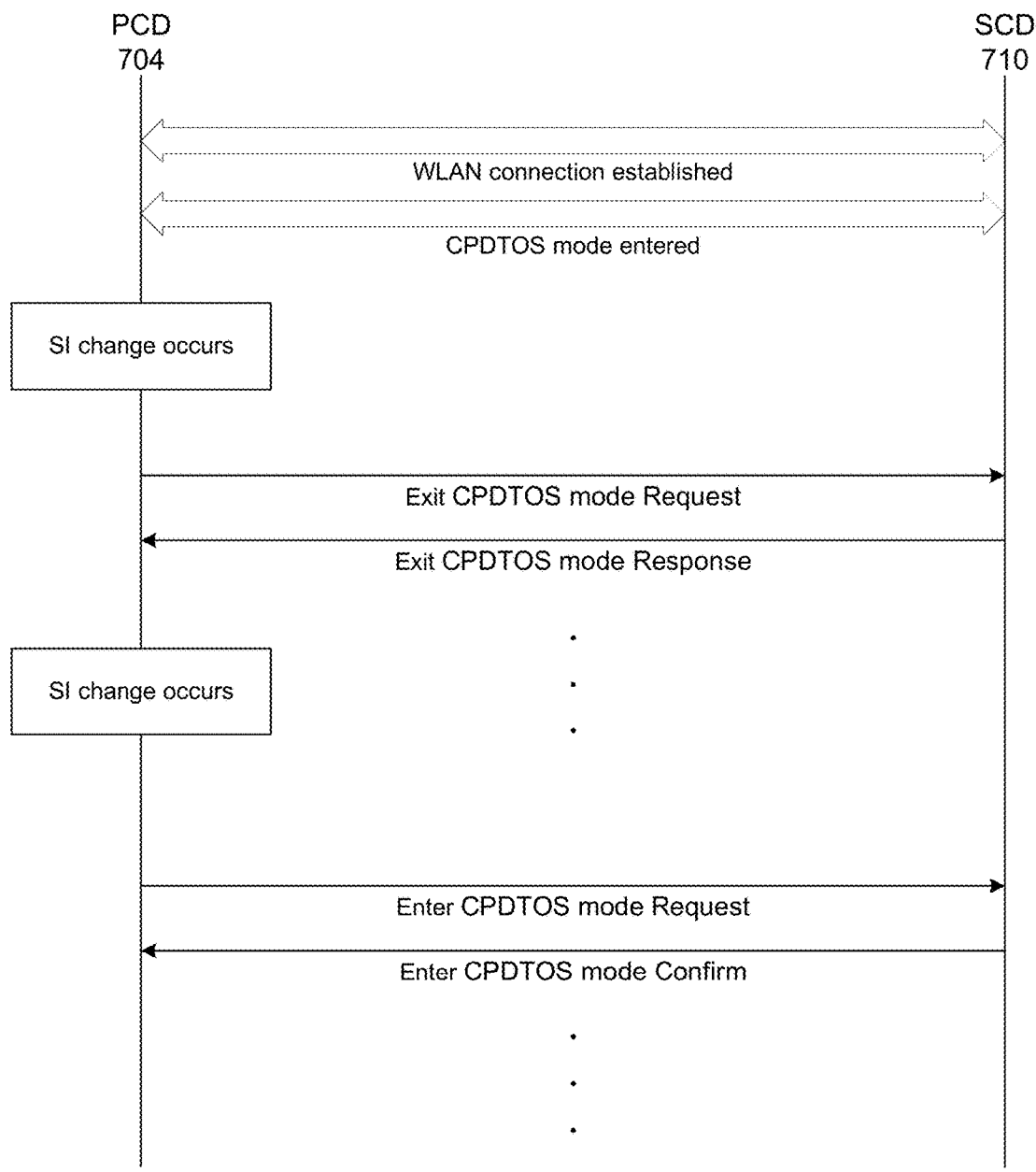
FIG. 15 illustrates an MSC for an example scenario for the handling of Discontinuous Reception (DRX) cycle change by leading to the exit from CPDTOS mode followed by DRX cycle change leading to entering to CPDTOS mode according to the aspects of the present disclosure.

The network may update the default DRX cycle or paging cycle as part of SI change and which may change the PO to be monitored for the current serving cell for the PCD. Sometimes a user may change the DRX cycle on the PCD and which may also lead to change in the PO to be monitored for the current serving cell for the PCD. According to an aspect of the present disclosure, when the PCD and the SCDs are in CPDTOS mode and if there is a change in the PO to be monitored for the PCD serving cell, the PCD may not be able to continue the CPDTOS mode with one or more of the SCDs then the PCD may send "Exit CPDTOS mode Request" to one or more of the SCDs and may exit the CPDTOS mode with those SCDs. An example of MSC for handling this type of scenario is illustrated in FIG. 15 where initially the PCD 704 and the SCD 710 are in CPDTOS mode. At some point the SI of the camped on cell of the SCD 710 may be updated by the WWAN. The PCD 704 may determine that it may not be able to support the CPDTOS mode for the SCD 710 for the updated DRX cycle in the new SI. Therefore, the PCD 704 may send the "Exit CPDTOS mode Request" message to the SCD 710 which may accept the request and send the "Exit CPDTOS mode Response" message to the PCD. At further later point in time, the SI of the camped on cell of the SCD 710 may be updated by the network and the PCD may send the "WWAN Camped on Cell Information Response" message to the PCD to update its serving cell information. The PCD 704 may determine that it may be able to support the CPDTOS mode for the SCD 710 for the updated DRX cycle in the newly updated SI. Therefore, the PCD 704 may send the "Enter CPDTOS mode Request" message to the SCD 710 which may accept the request and send the "Enter CPDTOS mode Response" message to the PCD. From this point forward, the PCD may continue to monitor the PO and the SI for the serving cell of the SCD 710.

As part of the SI update, the default DRX cycle or paging cycle may change for the cells of the same or different frequencies and/or RAT types that are monitored for the SCDs. According to an aspect of the present disclosure, if a SCD detects a change in the default DRX cycle or paging cycle which may change the default PO to be monitored in its current serving cell then the SCD may communicate the changed default DRX cycle or paging cycle to the PCD. According to an aspect of the present disclosure, when there is a change in the PO for the SCD's serving cell and the PCD may not be able to continue to monitor the new PO because of overlap in PO and in such a case the PCD may send "Exit CPDTOS mode Request" to one or more of the SCDs and may exit the CPDTOS mode with those SCDs.

According to an aspect of the present disclosure, a PCD may perform SI monitoring and updating as described in U.S. patent application Ser. No. 15/351,999 and U.S. patent application Ser. No. 15/352,097, in combination with PO monitoring and decoding as per the aspect of the present disclosure. According to an aspect of the present disclosure, the redundant steps performed as described in U.S. patent application Ser. No. 15/351,999 and U.S. patent application Ser. No. 15/352,097 and the present disclosure may be eliminated. For example, in U.S. patent application Ser. No. 15/351,999 and U.S. patent application Ser. No. 15/352,097, the PO monitoring and decoding is done only for the purpose of detecting any update in SI of all the monitored cells. The PO is not determined according to a particular SCD's identity. Rather, the PO instances are selected to avoid any collision of paging decoding with SI or any other decoding. In the present application, the PO monitoring and decoding is done to check for any incoming paging message for specific SCDs. Therefore, the step of PO monitoring for detecting change in SI may be combined with the step of PO decoding for receiving paging messages for SCDs.

According to an aspect of the present disclosure, a PCD may perform measurements for SCDs as described in U.S. application Ser. No. 15/383,450 filed Dec. 19, 2016 in combination with PO monitoring and decoding as per the aspect of the present disclosure. According to an aspect of the present disclosure, the redundant steps performed as described in U.S. application Ser. No. 15/383,450, incorporated by reference herein, and the present disclosure may be eliminated.

According to an aspect of the present disclosure, a PCD may perform SI monitoring and updating as described in U.S. patent application Ser. No. 15/351,999 and U.S. patent application Ser. No. 15/352,097, and may perform measurements for SCDs as described in U.S. application Ser. No. 15/383,450 in combination with PO monitoring and decoding as per the aspect of the present disclosure. According to an aspect of the present disclosure, the redundant steps performed as described in U.S. patent application Ser. No. 15/351,999, U.S. patent application Ser. No. 15/352,097 and U.S. application Ser. No. 15/383,450 and the present disclosure may be eliminated.

Although the term SRWL is used herein to describe the various aspects of the present disclosure, the disclosure may be applicable to any client device that may be using a WWAN and the short range connectivity link may not necessarily be wireless and the client device may not necessarily be mobile. For example, the PCD and the SCDs may be communicating over a wired connection such as Universal Serial Bus (USB), Universal Asynchronous Receiver/Transmitter (UART), Inter-Integrated Circuit (I2C), General Purpose Input/Output (GPIO), Ethernet cables, etc. In one example of connectivity, the SCDs may be connected to the PCD over Ethernet for internet connection but may continue to use the WWAN for other services. In this case the PCD may use its own WWAN modem to decode the SI of the cell on which the SCD is camped and provide any updated SIs to the SCDs over the Ethernet. In another example, an SCD may be connected to a Personal Computer (PC) that has a built-in WWAN modem. The SCD may be connected to the PC over a USB cable for charging and/or transferring music, images, videos, etc. between the PC and the SCD. In this case, the PC may be in the equivalent role of a PCD. The PC may use its WWAN modem to decode the SI of the cell on which the SCD is camped and provide any updated SIs to the SCDs over the USB cable.

The invention claimed is:

1. A method of collaborative communication of paging information in a communication network, in which a Short Range Wireless Links (SRWL) is established between a first client device and at least one second client device, the method comprising:
controlling, by a processing device, at the first client device,
transmitting, via a transmitter, a broadcast Primary Client Device (PCD) Request message over the SRWL;
receiving, via a receiver, a PCD Accept message over the SRWL from at least one third client device of the at least one second client device, in which the PCD Accept message is transmitted from the at least one third client device based on a determination at the least one third client device to receive paging information of a Wireless Wide Area Network (WWAN) through the first client device; and
transmitting, via the transmitter, over the SRWL a PCD Confirm message indicating designation of the first client device as a PCD for the at least one third client device, in which the at least one third client device is a Secondary Client Device (SCD) of the first client device.

2. The method of claim 1,
in which the at least one second client device includes a plurality of second client devices, and further comprising
when (i) at least one fourth client device of the plurality of second client devices transmits over the SRWL a second PCD Request when the PCD Request is transmitted from the first client device and (ii) the first client device is the PCD for the least one third client device,
controlling, by the processing device, at the first client device,
receiving, via the receiver from the at least one fourth client device over the SRWL, a PCD Revoke message, in which the at least one fourth client device, by sending the PCD Revoke message, accepts the first client device as the PCD for the at least one fourth client device.

3. The method of claim 1, further comprising:
controlling, by the processing device, at the first client device,
communication and exchanging over the SRWL of WWAN capabilities with the SCD including at least one Radio Access Technology (RAT) type supported.

4. The method of claim 3, wherein the at least one RAT type includes at least one of one Code Division Multiple Access (CDMA), Global System for Mobile communication (GSM), Long Term Evolution (LTE) or General Packet Radio Service (GPRS).

5. The method of claim 3,
wherein the exchanging of WWAN capabilities includes, for a given cell on which each of the first client device and the least one third client device is camped, at least one of a current WWAN identity, a given RAT type, a cell identification (CID), target area information (TAI), frequency of channel, or default Discontinuous Reception (DRX) cycle or paging cycle.

6. The method of claim 1, further comprising:
controlling, by the processing device, at the first client device, when the first client device and the at least one third client device are currently camped on to a same serving cell of a same Radio Access Technology (RAT) type and a same frequency,
monitoring over the SRWL and decoding a paging message of the WWAN addressed to the SCD; and
requesting over the SRWL to the SCD decoding information required for decoding the paging message and receiving the decoding information via the receiver from the SCD.

7. The method of claim 6, wherein the decoding information indicates at least one of SCD identity, a Discontinuous Reception (DRX) cycle, or other information necessary for deriving a Paging Occasion (PO) at the PCD and successfully decoding a paging record in the paging message.

8. The method of claim 7, in which the SCD identity is International Mobile Subscriber Identity (IMSI) or Temporary Mobile Subscriber Identity (TMSI).

9. The method of claim 6, further comprising:
controlling, by the processing device, at the first client device, when the decoding information is received, entering into a Cellular Paging Decoded and Transmitted over SRWL (CPDTOS) mode with the SCD, in which the SCD disables paging message decode related processing as long as the SCD is connected to the PCD and is in the CPDTOS mode.

10. The method of claim 9, further comprising:
controlling, by the processing device, at the first client device, when a change in a camped on cell is determined for the PCD or the SCD, communication with the SCD over the SRWL to determine whether to continue in or exit the CPDTOS mode.

11. The method of claim 1, further comprising:
controlling, by the processing device, at the first client device, when the first client device as the PCD of the at least one third client device and at the least one third client device are currently camped on to cells $C_{f1}$ and $C_{f2}$ respectively of different frequencies having a same Radio Access Technology (RAT) type,
determining whether paging messages from the cell $C_{f2}$ are decodable, wherein to decode the paging messages the PCD is required to tune to frequency f2 of the cell $C_{f2}$ while monitoring a frequency f1 of the cell $C_{f1}$;
when a determination is the paging messages from the cell $C_{f2}$ are not decodable, not initiating entry into a Cellular Paging Decoded and Transmitted over SRWL (CPDTOS) mode for the SCD; and
when a determination is the paging messages from the cell $C_{f2}$ are decodable, entering the CPDTOS mode for the SCD, monitoring Paging Occasions (POs) and decoding the paging messages.

12. The method of claim 11, further comprising:
controlling, by the processing device, at the first client device, when a cell reselection is determined in the PCD or the SCD, communication with the SCD over the SRWL whether to continue in or exit the CPDTOS mode.

13. The method of claim 1, further comprising,
controlling, by the processing device, at the first client device, when the PCD and the SCD are currently camped on cells $C_{RAT1}$ and $C_{RAT2}$ of different first and second Radio Access Technology (RAT) types RAT1 and RAT2, respectively,
determining whether (i) the RAT2 and frequencies used by the RAT2 are supported by the PCD, and (ii) a paging message from the cell $C_{RAT2}$ is decodable where decoding of the paging message requires the PCD to tune a frequency of the cell $C_{RAT2}$ while the PCD is monitoring the cell $C_{RAT1}$;

when the paging message from the cell $C_{RAT2}$ is determined to be not decodable, not initiating entry into a Cellular Paging Decoded and Transmitted over SRWL mode (CPDTOS) with the SCD; and when the paging message from the cell $C_{RAT2}$ is determined to be decodable, entering into the CPDTOS mode with the SCD, decoding given paging messages in respective Paging Occasions (POs) time instances, and determining whether a paging record of the decoded given paging messages matches an identity of the SCD.

14. The method of claim 13, further comprising:
when a cell reselection is determined at the PCD or the SCD, controlling, by the processing device, at the first client device, communication over the SRWL with the SCD to determine whether to continue in or exit the CPDTOS mode with the SCD.

15. The method of claim 1, further comprising,
controlling, by the processing device, at the first client device, when the PCD agrees with the SCD on monitoring and decoding paging messages for the SCD which is camped on to a same or different cell as a serving cell of the PCD and having a same or different frequency or Radio Access Technology (RAT) type from the serving cell, monitoring Paging Occasion (POs) in downlink for all agreed upon cells of different frequencies and RAT types.

16. The method of claim 15, further comprising,
controlling, by the processing device, at the first client device, managing a downlink monitoring schedule for each of the agreed upon cells.

17. The method of claim 1, further comprising,
controlling, by the processing device, at the first client device,
when an overlap in Paging Occasions (POs) of a serving cell of the SCD which is different than a serving cell of the PCD, in which the SCD serving cell has a same or different frequency and Radio Access Technology (RAT) type as the PCD serving cell, is determined,
transmitting, via the transmitter over the SRWL a Paging Details Information Request message to the SCD to change a Discontinuous Reception (DRX) cycle to determine whether the change in the DRX avoids PO overlap; and
receiving, via the receiver over the SRWL from the SCD a Paging Details Information Response message indicating the change in the DRX cycle at the SCD; and
when any non-overlapping POs for the SCD is not determined, communicating over the SRWL an indication that any non-overlapping POs for the SCD is not determined and not entering or exiting a Cellular Paging Decoded and Transmitted over SRWL mode (CPDTOS) for the SCD.

18. The method of claim 1, further comprising,
controlling, by the processing device, at the first client device, when, based on an attempt to decode a paging message for the SCD, in which the SCD is camped on at least one cell having a same or different frequency and (Radio Access Technology) RAT type as a serving cell of the PCD, an overlap with a Paging Occasion (PO) of the at least one first cell is determined, in which the PCD is entered into a Cellular Paging Decoded and Transmitted over SRWL mode (CPDTOS) with SCD, a process 1) of prioritizing a second cell having the same frequency and RAT type as the PCD serving cell, a process 2) of prioritizing PO decoding of a third cell having a frequency and RAT type other than the frequency and RAT type of the PCD serving cell, a process 3) of prioritizing PO monitoring based on a priority request from the SCD indicating a current state of battery level at the SCD, or a process 4) of, when the PO overlap is detected, deciding whether to monitor or cancel a given PO of a given SCD, according to priorities configured at the PCD for at least one of given SCDs, given RAT types or given frequencies for PO monitoring.

19. The method of claim 18,
wherein the process 1) includes, for a cell having a frequency and RAT type other than the frequency and RAT type of the PCD serving cell for which the overlap of the PO is determined, communicating over the SRWL to the SCD an indication that a next PO for the SCD may not be decodable, requesting the SCD to perform the PO decode by itself, and continuing the CPDTOS mode with the SCD,
wherein, when a determination is a request from the PCD for decoding the PO and continuing the CPDTOS mode is denied by the SCD, exiting the CPDTOS mode with the SCD, and
when an ongoing system information (SI) decode is completed and a non-overlapping PO for the SCD where the PCD previously exited the CPDTOS mode or could not enter the CPDTOS mode because of the overlap in the PO in the past due to the SI decode is determined, transmitting via the transmitter over the SRWL a WWAN Camped on Cell Information Request message or Enter CBIBOS mode request message to the SCD to request the SCD to enter the CPDTOS mode.

20. The method of claim 18,
wherein the process 2) includes determining to defer system information (SI) decoding for a given second cell having the same frequency and RAT as the PCD serving cell when delayed decoding of the SI is determined not to impact predetermined normal operation and performance of the PCD.

21. The method of claim 18, wherein the process 3) includes determining, based on the priority request, a given SCD for monitoring of PO and another given SCD for canceling monitoring of PO.

22. The method of claim 18, wherein the priority request is communicated over the SRWL in a Paging Details Information Response message from the SCD.

23. The method of claim 1, further comprising:
controlling, by the processing device, at the first client device,
transmitting to the SCD, via the transmitter over the SRWL, a WWAN Camped-on Cell Information Request message indicating information of a cell $C_x$ on which the PCD is currently camped including at least one of Radio Access Technology (RAT) type, frequency or cell identity (CID); and
when a WWAN Camped-on Cell Information Response message is received from the SCD over the SRWL indicating a relative time offset $RTO_{xy}$ of a cell $C_y$ on which the SCD is camped to the cell G as estimated at the SCD, using the relative time offset $RTO_{xy}$ to synchronize timing with the cell $C_y$ and for decoding a paging message in the cell $C_y$.

24. The method of claim 1, further comprising:
controlling, by the processing device, at the first client device, when the first client device includes M receiver/decoder circuits, decoding in parallel overlapping Paging Occasions (POs) from N cells of a same or different frequency and Radio Access Technology (RAT) type, in which M and N are the same or different.

25. The method of claim 1, further comprising:
controlling, by the processing device, at the first client device, at any time communicating with the SCD over the SRWL and exiting Cellular Paging Decoded and Transmitted over SRWL mode (CPDTOS) with the SCD.

26. The method of claim 1, further comprising:
controlling, by the processing device, at the first client device, when the PCD fails to decode a paging message in any PO for the SCD, notifying, over SRWL, the SCD of the failure to decode and exiting Cellular Paging Decoded and Transmitted over SRWL mode (CPDTOS) with the SCD.

27. The method of claim 1, further comprising:
controlling, by the processing device, at the first client device, when the PCD decodes paging messages in respective time instances of Paging Occasions (PO) and a determination is no match of a paging record in the decoded paging messages with an identity of the SCD, transmitting, via the transmitter over the SRWL, a No Matching Paging Record Received Indication message to the SCD.

28. The method of claim 27, further comprising:
controlling, by the processing device, at the first client device,
when the paging record in the decoded paging messages is determined to match the identity of the SCD, transmitting via the transmitter over the SRWL a Matching Paging Record Received Indication message to the SCD.

29. The method of claim 27, wherein the Matching Paging Record Received Indication message is generated using respective applications executed in the PCD and the SCD and communicating through a peer to peer protocol on any logical channel of the SRWL.

30. The method of claim 29,
wherein each application is independent of a given SRWL and achieved through a virtual communication port established in the PCD and the SCD, wherein a connection of the SRWL is mapped to the virtual communication port, and wherein the applications respectively of the PCD and SCD communicate using the virtual communication port.

31. The method of claim 1, further comprising:
controlling, by the processing device, at the first client device, autonomously entering Cellular Paging Decoded and Transmitted over SRWL mode (CPDTOS) with a new SCD and starting broadcasting, over the SRWL, a Paging Details Information Request message.

32. The method of claim 1, in which the first client device is configured to at least one of monitor or decode Paging Occasions (POs) of a set of cells having a same or different frequency and Radio Access Technology (RAT).

33. The method of claim 1, further comprising:
controlling, by the processing device at the first client device, creating, with the SCD, a Cellular Paging Message Communication Channel (CPMCC) as a physical or logical channel which is pre-negotiated and dedicated for Cellular Paging Decoded and Transmitted over SRWL mode (CPDTOS) information exchange,
in which the CPMCC has a periodicity and time slot for broadcast by the PCD of a Matching Paging Record Received Indication message, and a second periodicity and second time slot for monitoring by the SCD of receiving a paging record from the PCD, and
in which cellular network information exchange other than the Matching Paging Record Received Indication is exchangeable between the SCD and the PCD over the CPMCC.

34. The method of claim 1, wherein the first client device uses a cable modem thereof to provide internet service while using a WWAN modem thereof only for monitoring and decoding of Paging Occasions (POs).

35. The method of claim 1, further comprising:
controlling, by the processing device, at the first client device,
when the PCD and the SCD are in Cellular Paging Decoded and Transmitted over Short Range Wireless Links (SRWL) mode (CPDTOS), a cell change occurs in the PCD or the SCD, and the PCD is not able to continue the CPDTOS mode with the SCD, transmitting, via the transmitter over the SRWL, an Exit CPDTOS mode Request message to and exiting the CPDTOS mode with the SCD.

36. The method of claim 1, further comprising:
controlling, by the processing device, at the first client device,
when the PCD and the SCD are in Cellular Paging Decoded and Transmitted over Short Range Wireless Links (SRWL) mode (CPDTOS), a Paging Occasion (PO) to be monitored for a serving cell of the PCD is changed, and the PCD is not able to continue the CPDTOS mode with the SCD, transmitting via the transmitter over the SRWL an Exit CPDTOS mode Request message to and exiting the CPDTOS mode with the SCD.

37. The method of claim 1, further comprising:
controlling, by the processing device, at the first client device,
when a first change in a default Discontinuous Reception (DRX) cycle or paging cycle is detected at the SCD and communicated to the PCD over the SRWL, in which the first change is based on detection of a change in a Paging Occasion (PO) of a serving cell of the SCD such that the PCD is not able to continue to monitor a new PO because of overlap in given PO, transmitting an Exit Cellular Paging Decoded and Transmitted over SRW) mode Request message to the SCD via the transmitter over the SRWL and exiting the CPDTOS mode with the SCD.

38. The method of claim 1, further comprising:
controlling, by the processing device, at the first client device, performing Paging Occasion (PO) monitoring and decoding for detecting an update in system information (SI) of each monitored cell to avoid collision of paging decoding with the SI or any other decoding, without regard to an identify of a given SCD,
in which the PO monitoring for detecting change in the SI by the PCD is combined with PO decoding for receiving paging messages for the given SCD.

39. A method of collaborative communication of paging information in a communication network, in which a Short Range Wireless Links (SRWL) is established between a first client device and a plurality of second client devices, the method comprising:

controlling, by a processing device, at the first client device,
> transmitting, via the transmitter, a broadcast Primary Client Device (PCD) Request message over the SRWL, wherein the PCD Request is transmitted from the first client device when a third client device of the second client devices transmits another broadcast PCD request over the SRWL; and
> when a PCD Accept message responsive to the another PCD request is transmitted from at least one fourth client device of the second client devices based on a determination at the least one fourth client device to receive paging information of a Wireless Wide Area Network (WWAN) through the third client device,
> > (i) transmitting via the transmitter over the SRWL a PCD Revoke message and a PCD Confirm message accepting the third client device as the PCD for the at least fourth client device, or
> > (ii) waiting for a predetermined time to receive over the SRWL another PCD Accept message from at least one fifth client device of the second client devices, such that the first client device is a PCD for the at least fifth client device.

40. An apparatus for collaborative communication of paging information in a communication network, in which a Short Range Wireless Links (SRWL) is established between a first client device and at least one second client device, the apparatus comprising:
> circuitry configured to control, by a processing device, at the first client device,
> > transmitting, via a transmitter, a broadcast Primary Client Device (PCD) Request message over the SRWL;
> > receiving, via a receiver, a PCD Accept message over the SRWL from at least one third client device of the at least one second client device, in which the PCD Accept message is transmitted from the at least one third client device based on a determination at the least one third client device to receive paging information of a Wireless Wide Area Network (WWAN) through the first client device; and
> > transmitting, via the transmitter, over the SRWL a PCD Confirm message indicating designation of the first client device as a PCD for the at least one third client device, in which the at least one third client device is a Secondary Client Device (SCD) of the first client device.

41. A wireless communication device comprising:
a receiver to receive a wireless communication; and
a processor configured for collaborative communication of paging information in a communication network, in which a Short Range Wireless Links (SRWL) is established between a first client device and at least one second client device,
wherein the processor, when executing instructions in a memory of the wireless communication device, is configured to control
> transmitting, via a transmitter, a broadcast Primary Client Device (PCD) Request message over the SRWL;
> receiving, via the receiver, a PCD Accept message over the SRWL from at least one third client device of the at least one second client device, in which the PCD Accept message is transmitted from the at least one third client device based on a determination at the least one third client device to receive paging information of a Wireless Wide Area Network (WWAN) through the wireless communication device; and
> transmitting, via the transmitter, over the SRWL a PCD Confirm message indicating designation of the wireless communication device as a PCD for the at least one third client device, in which the at least one third client device is a Secondary Client Device (SCD) of the wireless communication device.

42. An apparatus for collaborative communication of paging information in a communication network, in which a Short Range Wireless Links (SRWL) is established between a first client device and a plurality of second client devices, the apparatus comprising:
> circuitry configured to control, at the first client device,
> > transmitting, via a transmitter, a broadcast Primary Client Device (PCD) Request message over the SRWL, wherein the PCD Request is transmitted from the first client device when a third client device of the second client devices transmits another broadcast PCD request over the SRWL; and
> > when a PCD Accept message responsive to the another PCD request is transmitted from at least one fourth client device of the second client devices based on a determination at the least one fourth client device to receive paging information of a Wireless Wide Area Network (WWAN) through the third client device,
> > > (i) transmitting via the transmitter, over the SRWL a PCD Revoke message and a PCD Confirm message accepting the third client device as the PCD for the at least fourth client device, or
> > > (ii) waiting for a predetermined time to receive over the SRWL another PCD Acceptmessage from at least one fifth client device of the second client devices, such that the first client device is a PCD for the at least fifth client device.

43. A wireless communication device comprising:
a receiver to receive a wireless communication; and
a processor configured for collaborative communication of paging information in a communication network, in which a Short Range Wireless Links (SRWL) is established between a first client device and a plurality of second client devices,
wherein the processor, when executing instructions in a memory of the wireless communication device, is configured to control
> transmitting, via a transmitter, a broadcast Primary Client Device (PCD) Request message over the SRWL, wherein the PCD Request is transmitted from the wireless communication device when a third client device of the second client devices transmits another broadcast PCD request over the SRWL; and
> when a PCD Accept message responsive to the another PCD request is transmitted from at least one fourth client device of the second client devices based on a determination at the least one fourth client device to receive paging information of a Wireless Wide Area Network (WWAN) through the third client device,
> > (i) transmitting, via the transmitter, over the SRWL a PCD Revoke message and a PCD Confirm message accepting the third client device as the PCD for the at least fourth client device, or
> > (ii) waiting for a predetermined time to receive, via the receiver, over the SRWL another PCD Accept message from at least one fifth client device of the second client devices, such that the wireless communication device is a PCD for the at least fifth client device.

* * * * *